(12) United States Patent
Jung et al.

(10) Patent No.: US 8,780,061 B2
(45) Date of Patent: Jul. 15, 2014

(54) ELECTROSTATIC CAPACITY TYPE TOUCH SCREEN PANEL AND METHOD OF MANUFACTURING THE SAME

(75) Inventors: Gangseob Jung, Seoul (KR); Heekwang Kang, Seoul (KR); Suchang An, Seoul (KR); Sangsoo Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 319 days.

(21) Appl. No.: 12/960,164

(22) Filed: Dec. 3, 2010

(65) Prior Publication Data
US 2011/0193801 A1    Aug. 11, 2011

(30) Foreign Application Priority Data

Feb. 11, 2010  (KR) .................. 10-2010-0012617
Jun. 15, 2010  (KR) .................. 10-2010-0056716

(51) Int. Cl.
*G06F 3/041* (2006.01)
*G06F 3/044* (2006.01)

(52) U.S. Cl.
CPC .... *G06F 3/0412* (2013.01); *G06F 2203/04111* (2013.01); *G06F 2203/04103* (2013.01); *G06F 3/044* (2013.01)
USPC ..................... 345/173; 178/18.03; 178/18.06; 345/174

(58) Field of Classification Search
USPC ............ 345/173–178, 104; 178/18.01–18.09, 178/18.11
See application file for complete search history.

(56) References Cited

U.S. PATENT DOCUMENTS 5,804,476 A     9/1998  Jang
6,882,338 B2 *  4/2005  Flowers ........................ 345/174

(Continued)

FOREIGN PATENT DOCUMENTS

GB   2476134 A   6/2011
GB   2478804 A   9/2011

(Continued)

OTHER PUBLICATIONS

Office Action issued in corresponding United Kingdom Patent Application No. GB1019851.3, mailed Apr. 30, 2012.

(Continued)

*Primary Examiner* — Stephen Sherman
(74) *Attorney, Agent, or Firm* — Brinks Gilson & Lione

(57) ABSTRACT

A touch screen panel includes a substrate having an electrode forming part, and a routing wire forming part, where the routing wire forming part is located at an area outside the electrode forming part. A plurality of first electrode connection patterns is located in the electrode forming part. A plurality of first routing wires and a plurality of second routing wires are both located in the routing wire forming part, and the routing wires are disposed on the same layer with the first electrode connection patterns. An insulation layer is formed on the substrate and over the first electrode connection patterns. The insulation layer has at least two contact holes that expose contact portions of each the plurality of first electrode connection patterns. A plurality of first serial electrodes are arranged in parallel in a first direction and are connected with the plurality of first routing wires, respectively. Each first serial electrode includes a plurality of first electrode elements. A plurality of second serial electrodes are arranged in parallel in a second direction, and are configured to intersect the first serial electrodes. The second serial electrodes are connected with the plurality of second routing wires, respectively, and each second serial electrode includes a plurality of second electrode elements. Each of the plurality of first electrode connection patterns connects adjacent electrode elements of each first serial electrode through respective contact portions accessible through the at least two contact holes.

19 Claims, 36 Drawing Sheets

(56) References Cited

U.S. PATENT DOCUMENTS

| | | | |
|---|---|---|---|
| 7,123,332 B2* | 10/2006 | Yamazaki et al. | 349/149 |
| 2002/0067344 A1* | 6/2002 | Chiu | 345/173 |
| 2003/0122797 A1* | 7/2003 | Bang et al. | 345/173 |
| 2006/0132461 A1* | 6/2006 | Furukawa et al. | 345/173 |
| 2007/0268243 A1 | 11/2007 | Choo et al. | |
| 2009/0160824 A1 | 6/2009 | Chih-Yung et al. | |
| 2010/0026661 A1 | 2/2010 | Teramoto | |
| 2010/0045613 A1 | 2/2010 | Wu et al. | |
| 2010/0110028 A1 | 5/2010 | Takahashi et al. | |
| 2010/0123674 A1 | 5/2010 | Wu et al. | |
| 2010/0164896 A1* | 7/2010 | Nakayama et al. | 345/173 |

FOREIGN PATENT DOCUMENTS

| | | |
|---|---|---|
| KR | 20080096977 A | 11/2008 |
| KR | 20080110477 A | 12/2008 |
| KR | 20090122586 A | 12/2009 |

OTHER PUBLICATIONS

Office Action issued in corresponding United Kingdom Patent Application No. GB 1019851.3, mailed Mar. 25, 2011.

Office Action issued in commonly owned U.S. Appl. No. 12/774,217, mailed Oct. 19, 2012.

Office Action issued in corresponding Korean Patent Application No. 10-2010-0056716, mailed Jun. 26, 2013, 4 pages.

Office Action issued in commonly owned U.S. Appl. No. 12/774,217, mailed Mar. 15, 2013.

Office Action issued in corresponding Chinese Patent Application No. 201010610152.5, mailed Mar. 1, 2013.

* cited by examiner

Before scratch test

After scratch test

⟨Scratch occurs⟩ color transition saturation

Before scratch test

After scratch test

ELECTROSTATIC CAPACITY TYPE TOUCH SCREEN PANEL AND METHOD OF MANUFACTURING THE SAME

This application claims the priority and the benefit of Korea Patent Application No. 10-2010-012617 filed on Feb. 11, 2010, U.S. patent application Ser. No. 12/774,217 filed on May 5, 2010, and Korea Patent Application No. 10-2010-056716 filed on Jun. 15, 2010, the entire contents of which is incorporated herein by reference as if fully set forth herein.

BACKGROUND

1. Field of the Invention

Embodiments of this invention relate to a capacitive type touch screen panel and a method of manufacturing the same.

2. Discussion of the Related Art

Along with the development of the electronics industry, display devices, such as a liquid crystal display, an electroluminescent display, and a plasma display panel having a quick response speed, low power consumption, and an excellent color reproduction rate, have been in the spotlight. The display device is used for various electronic products such as televisions, monitors for computers, notebook computers, mobile telephones, display units for refrigerators, personal digital assistants, automated teller machines, and the like. In general, the display device interfaces with various input devices such as a keyboard, a mouse, and a digitizer. However, when a separate input device such as a keyboard, a mouse, or digitizer is used, a user is required to know how to use the separate input device, and as the separate input device occupies space, customer dissatisfaction is increased. Therefore, need for a convenient and simple input device that can reduce erroneous operation is needed. Also, there is a need for a touch screen panel in which a user can input information by directly contacting a screen with a finger or a pen.

Because the touch screen panel has a simple configuration, which minimizes erroneous operations, the user can perform an input action without a separate input device, and can quickly and easily manipulate through contents displayed on a screen.

Touch screen panels are classified into a resistive type, a capacitive type, an electromagnetic type according to a detection method of a touched portion. The resistive type touch screen panel determines a touched position by a voltage gradient according to a change of resistance in a state that a DC voltage is applied to metal electrodes formed on an upper plate or a lower plate. The capacitive type touch screen panel senses a touched position according to a difference in capacitance created in an upper or lower plate when the user physically contacts with a conductive film formed on the upper or lower plate. The electromagnetic type touch screen panel detects a touched portion by reading an LC value induced as an electromagnetic pen touches a conductive film.

Hereinafter, a conventional capacitive type touch screen panel will be described with reference to FIGS. 1 and 2. FIG. 1 is a top plan view illustrating a conventional capacitive type touch screen panel, and FIG. 2 is a cross-sectional view illustrating the touch screen panel taken along line I-I' and line II-II' of FIG. 1.

Referring to FIGS. 1 and 2, the conventional capacitive type touch screen panel includes an electrode forming part 20, a routing wire forming part 40, a pad forming part 60, and a protective layer 50.

The electrode forming part 20 is formed on a substrate 10 and includes a plurality of first electrodes 21 arranged in parallel in a first direction (for example, an X-axis direction) and a plurality of second electrodes 22 arranged to intersect in a direction (for example, an Y-axis direction) perpendicular to the first electrodes 21. The first electrodes 21 and the second electrodes 22 intersect to each other, but sustain an electrical insulation state by an insulation film 30. Further, neighboring first electrodes 21 arranged in the first direction are connected to each other by a bridge 41. That is, the bridge 41 connects the neighboring first electrodes 21 to each other through contact holes 30a and 30b formed in the insulation film 30 covering the first and second electrodes 21 and 22.

The routing wire forming part 40 is formed on the substrate 10 at positions outside the electrode forming part 20 and includes a plurality of first routing wires 42 connected to the plurality of first electrodes 21, respectively, and a plurality of second routing wires 43 connected to the plurality of second electrodes 22, respectively.

The pad forming part 60 includes a plurality of first pads 61 connected to the plurality of first electrodes 21 through the plurality of first routing wires 42, respectively, and a plurality of second pads 62 connected to the plurality of second electrodes 22 through the plurality of second routing wires 43, respectively.

The protective layer 50 covers the electrode forming part 20 and the routing wire forming part 40 and prevents the first and second electrodes 21 and 22 and the first and second routing wires 42 and 43 from being exposed to the outside environment.

Hereinafter, a method of manufacturing a conventional capacitive type touch screen panel will be described with reference to FIGS. 3A to 3D.

Referring to FIG. 3A, a first conductive layer for forming first and second electrodes is deposited on the substrate 10 including an electrode forming part 20, a routing wire forming part 40, and the pad forming part 60 through a deposition process such as a sputtering method. As the first conductive layer, an indium tin oxide (ITO) layer is generally used. After a photoresist is coated on the substrate 10 on which the first conductive layer is formed, a first photoresist pattern for exposing the first conductive layer is formed in the electrode forming part 20 by performing a photolithography process using a first mask. After removing the first conductive layer exposed by the first photoresist pattern through wet etching, a plurality of first electrodes 21 and a plurality of second electrodes 22 intersecting the first electrodes 21 are formed on the substrate 10 by ashing the remaining first photoresist pattern.

Referring to FIG. 3B, after the first insulation film 30 is formed on the substrate 10 in which the plurality of first and second electrodes 21 and 22 are formed, the first insulation film 30 of the pad forming part 60 and the routing wire forming part 40 is removed and first and second contact holes 30a and 30b penetrating the first insulation film 30 of the electrode 20 are formed with a photolithography process and an etching process using a second mask. The first and second contact holes 30a and 30b expose a portion of the neighboring first electrodes 21. The first insulation film 30 includes silicon nitride, silicon oxide, or organic resin.

Referring to FIG. 3C, a second conductive layer is formed on an entire surface of the substrate 10 in which the first and second contact holes 30a and 30b are formed through a deposition process such as a sputtering method. The second conductive layer includes aluminum (Al) or molybdenum (Mo). After coating a photoresist on the substrate in which the second conductive layer is formed, first and second routing wires 42 and 43 are formed in a routing wire forming portion on the substrate 10 and a connection electrode 41 is formed on the first insulation film 30 of the electrode forming part 20 by performing a photolithography process and an etching process using a third mask. The connection electrode 41 connects the neighboring first electrodes 21 to each other through the first and second contact holes 30a and 30b formed in the first insulation film 30.

Referring to FIG. 3D, after a second insulation film 50 as a protective film is formed on an entire surface of the substrate 10 in which the connection electrode 41 and the first and second routing wires 42 and 43 are formed, a through hole 50a for penetrating the second insulation film 50 is formed to expose the first and second routing wires 42 and 43 of the pad 60 with a photolithography process and an etching process using a fourth mask.

However, the conventional capacitive type touch screen panel is manufactured with 4 mask processes, as described above, and each mask process accompanies a photolithography process requiring a series of continuous processes, such as photoresist (PR), coating, alignment, exposure, development, and cleaning, and thus it is necessary to reduce a number of a mask process. Further, because the first insulation film of an intersecting portion of the first electrode and the second electrode has a wide area and uses silicon nitride, silicon oxide, or organic resin, there is a problem that the first insulation film is viewed or apparent from the outside due to a color difference between the first insulation film and a periphery thereof. Further, the second insulation film formed as a protective film at the top of the touch screen panel is made of the same material as that of the first insulation film, and adhesive strength is weakened by gas used when depositing the first and second insulation films, and thus surface hardness is weakened. Therefore, after a touch screen panel is manufactured, when a next process of forming a display device is performed, an additional problem of a scratch occurs. FIG. 4 is a drawing illustrating states before and after performing a scratch test of the touch screen panel manufactured in the related art, wherein the left picture illustrates a state before a scratch test and the right picture illustrates a state after a scratch test.

SUMMARY

In one embodiment, a touch screen panel improves productivity by reducing a process tact time through reducing the number of mask process steps.

In another embodiment, a touch screen panel solves a visibility problem occurring due to a color difference between a first insulation layer for covering a first electrode, and a second electrode used as a touch electrode, which has a wider area and a periphery thereof. Transmittance and color transition characteristics are improved.

In another embodiment, a touch screen panel solves a problem of scratches occurring due to low surface hardness of a second insulation layer formed as a protective layer at the top of the touch screen panel.

Additional features and advantages of this invention will be set forth in the description which follows, and in part will be apparent from the description, or may be learned by practice of this invention. The objectives and other advantages of this invention will be realized and attained by the structure particularly pointed out in the written description and claims hereof as well as the appended drawings.

To achieve these and other advantages and in accordance with the purpose of this invention, as embodied and broadly described.

In one embodiment, a touch screen panel includes a substrate having an electrode forming part, and a routing wire forming part, where the routing wire forming part is located at an area outside the electrode forming part. A plurality of first electrode connection patterns is located in the electrode forming part. A plurality of first routing wires and a plurality of second routing wires are both located in the routing wire forming part, and the routing wires are disposed on the same layer with the first electrode connection patterns. An insulation layer is formed on the substrate and over the first electrode connection patterns. The insulation layer has at least two contact holes that expose contact portions of each the plurality of first electrode connection patterns. A plurality of first serial electrodes are arranged in parallel in a first direction and are connected with the plurality of first routing wires, respectively. Each first serial electrode includes a plurality of first electrode elements. A plurality of second serial electrodes are arranged in parallel in a second direction, and are configured to intersect the first serial electrodes. The second serial electrodes are connected with the plurality of second routing wires, respectively, and each second serial electrode includes a plurality of second electrode elements. Each of the plurality of first electrode connection patterns connects adjacent electrode elements of each first serial electrode through respective contact portions accessible through the at least two contact holes.

In another embodiment, a touch screen panel includes a substrate including an electrode forming part, and a routing wire forming part, where the routing wire forming part is located at an area outside the electrode forming part. A plurality of first electrode connection patterns is formed on the substrate and is separate from each other. A plurality of first routing wires and a plurality of second routing wires are both formed in the routing wire forming part. A plurality of first serial electrodes are arranged in parallel in a first direction, with each first serial electrode including a plurality of first electrode elements separate from each other. A first electrode connection pattern connects adjacent electrode elements of each first serial electrode, respectively. An insulation layer is formed on a portion of the substrate and over the first electrode connection patterns. A plurality of second serial electrodes is arranged in parallel in a second direction, and is configured to intersect the first serial electrodes. Each second serial electrode includes a plurality of second electrode elements. The first serial electrodes are connected with the plurality of first routing wires, respectively, and the second serial electrodes are connected with the plurality of second routing wires, respectively.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention. In the drawings.

DETAILED DESCRIPTION

Figure 1:
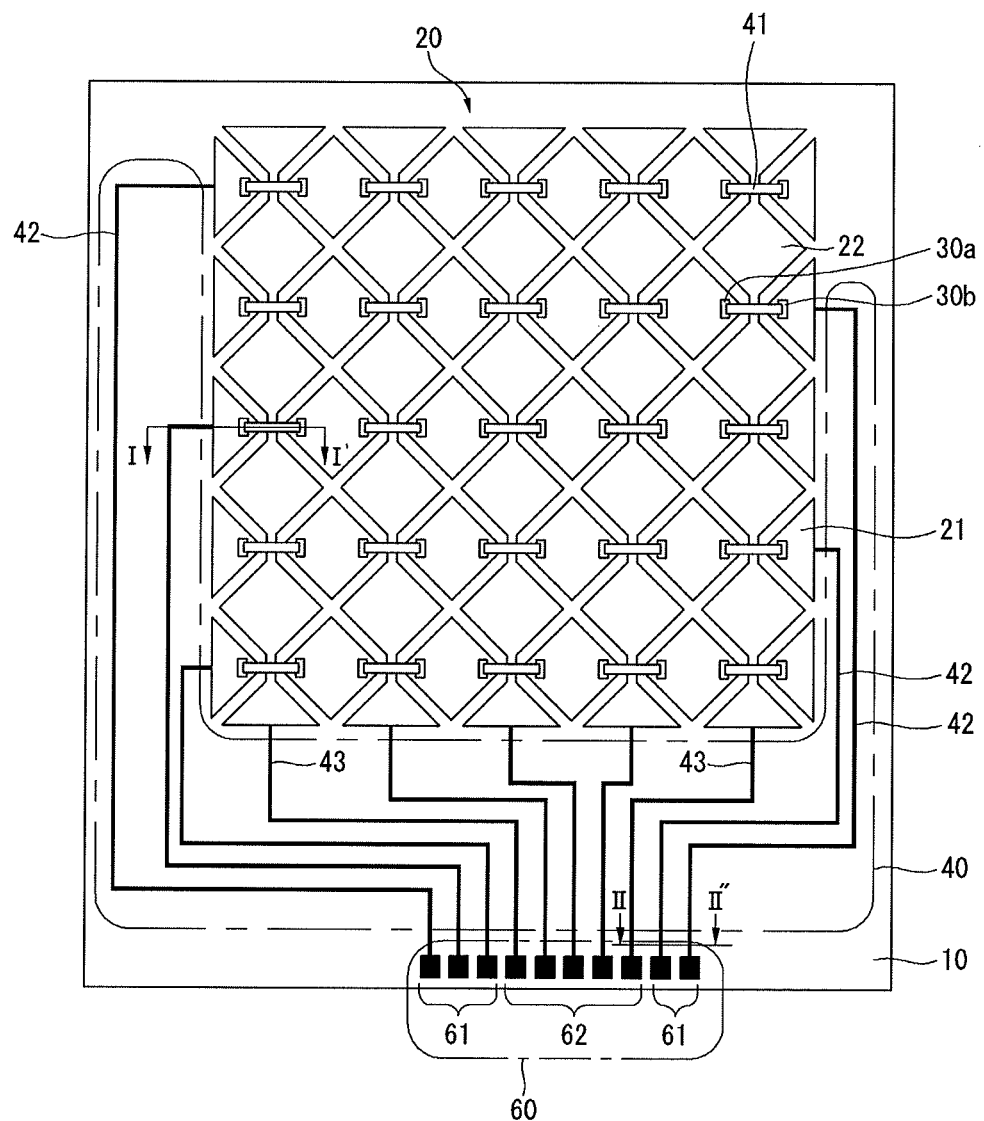
FIG. 1 is a top plan view illustrating a related art electrostatic capacitive type touch screen panel.
Figure 2:
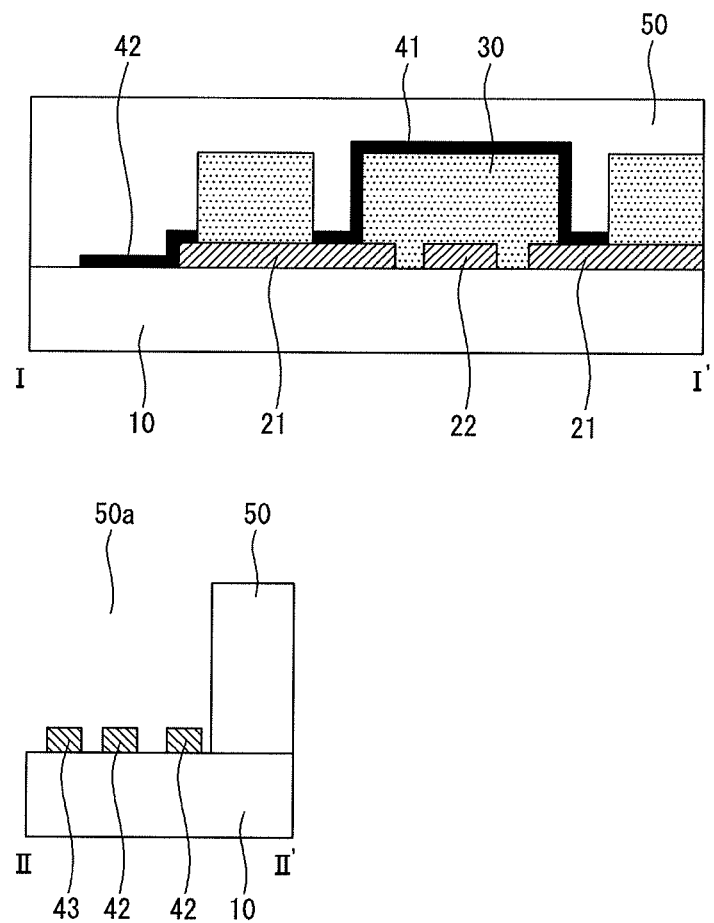
FIG. 2 is a cross-sectional view illustrating the touch screen panel taken along line I-I' and line II-II' of FIG. 1.
Figure 3A:
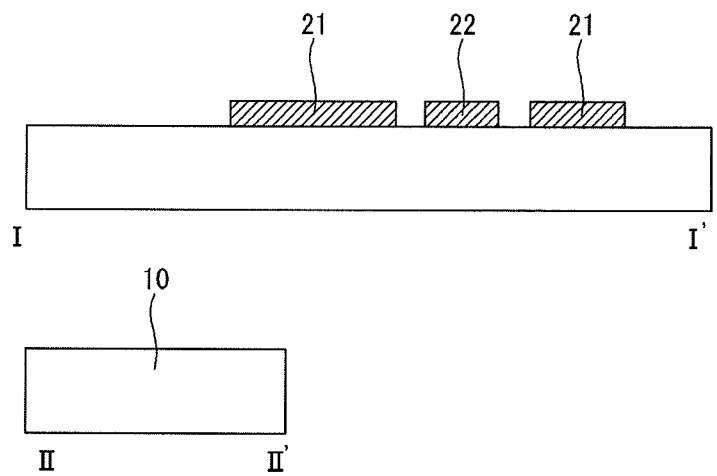
FIGS. 3A to 3D are cross-sectional views illustrating a process of manufacturing the touch screen panel shown in FIG. 1.
Figure 3B:
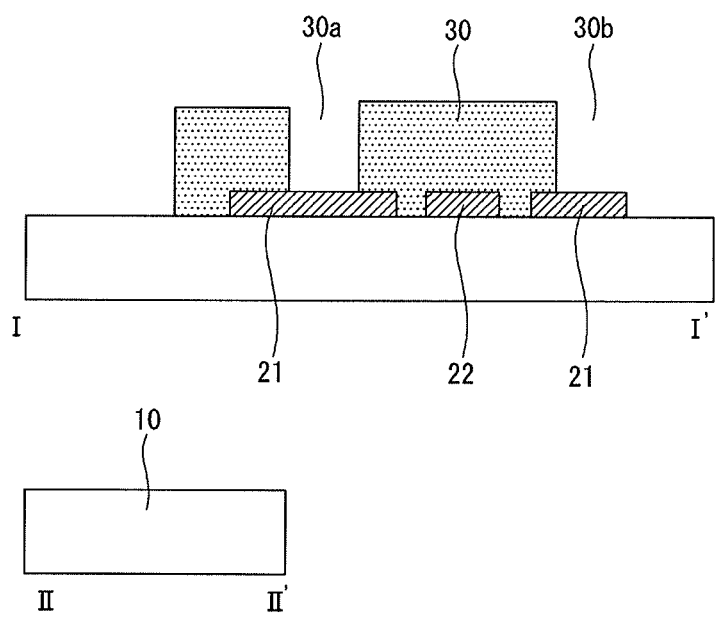
Figure 3C:
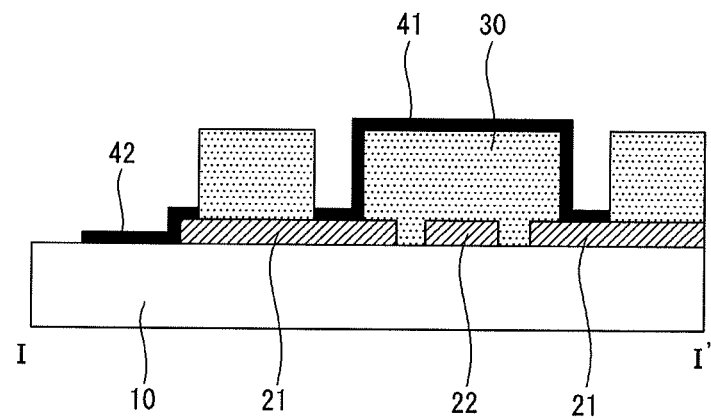
Figure 3C:
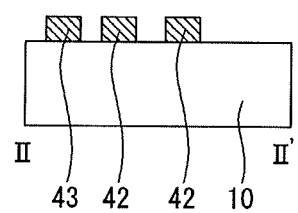
Figure 3D:
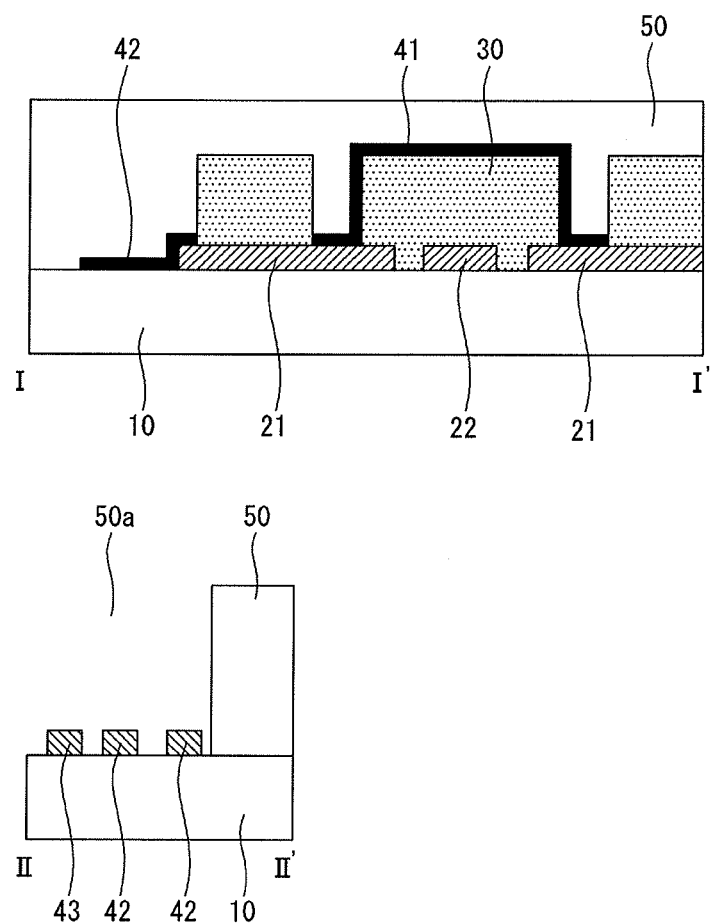
Figure 4:
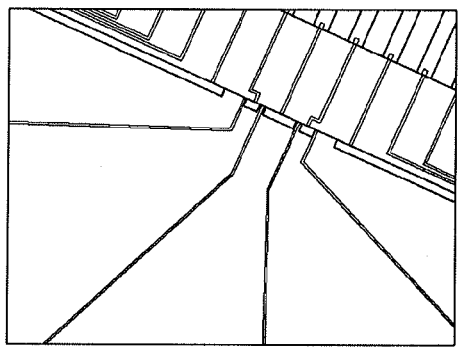
FIG. 4 is a drawing illustrating states before and after performing a scratch test of the related art touch screen panel.
Figure 4:
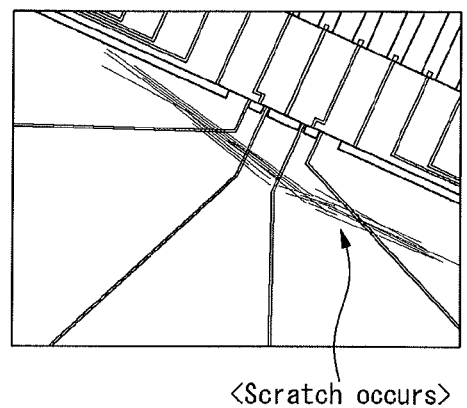

Hereinafter, example of various embodiments will be described in detail with reference to FIGS. 5 to 26. Like reference numerals designate like elements throughout the specification.

Figure 5:
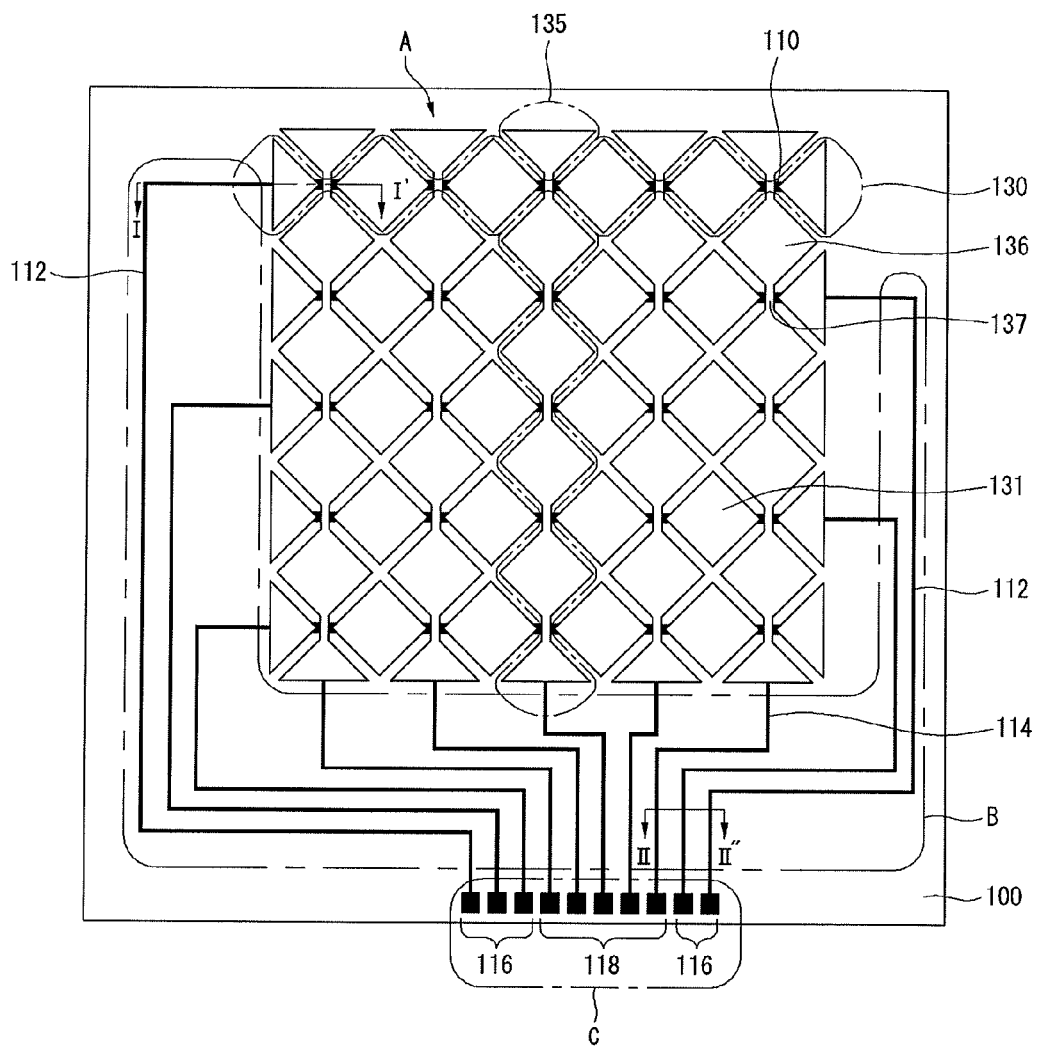
FIG. 5 is a top plan view illustrating an electrostatic capacitive touch screen panel according to a first embodiment of this invention.

An electrostatic capacitive touch screen panel according to a first embodiment of this invention will be described with reference to FIGS. 5 and 6. FIG. 5 is a top plan view illustrating the touch screen panel according to the first embodiment of this invention, and FIG. 6 is a cross-sectional view illustrating the touch screen panel taken along line I-I' and line II-II' of FIG. 5.

Figure 6:
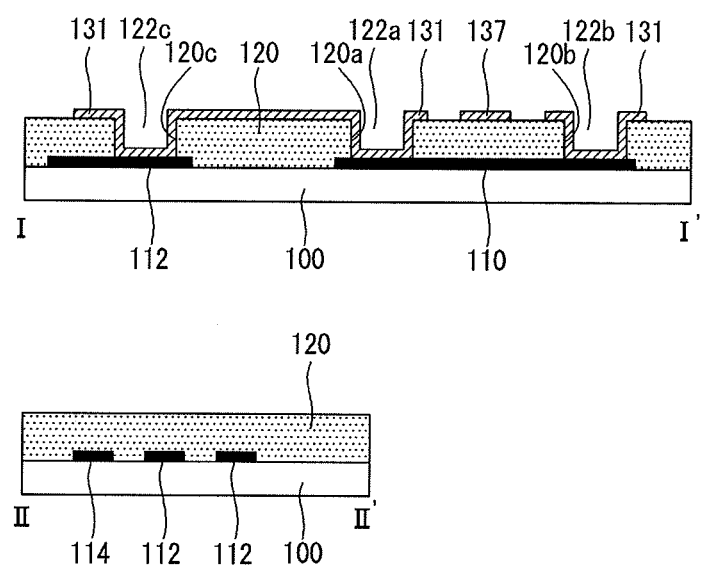
FIG. 6 is a cross-sectional view illustrating the touch screen panel taken along line I-I' and line II-II' of FIG. 5.

Referring to FIGS. 5 and 6, the touch screen panel according to the first embodiment of this invention includes an electrode forming part A, a routing wire forming part B, and a pad forming part C.

The electrode forming part A includes a plurality of first electrode serials 130 optionally arranged in parallel in a first direction (for example, an X-axis direction) and a plurality of second electrode serial 135 optionally arranged in parallel in a second direction (for example, an Y-axis direction) to intersect with the first direction. The first electrode serials 130 may also be referred to as first serial electrodes 130 because of their serial or linear repeating pattern of polygonal element. Similarly, the second electrode serials 135 may also be referred to as second serial electrodes 135 because of their serial or linear repeating pattern of polygonal elements. Each of the first electrode serials 130 includes first electrode patterns 131 having a triangle, a rectangle, a square, a quadrangle, a diamond shape, a polygonal shape, and the like, and first connection patterns 110 for connecting neighboring first electrode patterns 131. Any suitable shape of the elements of the first electrode pattern 131 may be used. Each of the second electrode serials 135 includes second electrode patterns 136 having a triangle, a rectangle, a square, a quadrangle, a diamond shape, a polygonal shape, which may be similar to the first electrode patterns 131 and second connection patterns 137 for connecting neighboring second electrode patterns 136. Any suitable shape of the elements of the second electrode pattern 136 may be used.

In the first embodiment of this invention, the first connection patterns 110 are formed separately from the first electrode patterns 131, and the second connection patterns 137 are integrally formed with the second electrode patterns 136. Alternatively, the first connection patterns 110 may be integrally formed with the first electrode patterns 131, and the second connection patterns 137 may be formed separately from the second electrode patterns 136.

The routing wire forming part B is formed on the substrate 100 at positions outside the electrode forming part A, and includes a plurality of first routing wires 112 connected to the plurality of first electrode serials 130, respectively and a plurality of second routing wires 114 connected to the plurality of second electrode serials 135, respectively.

The pad forming part C includes a plurality of first pads 116 connected to the plurality of first electrode serials 130 through the plurality of first routing wires 112, respectively, and a plurality of second pads 118 connected to the plurality of second electrode serials 135 through the plurality of second routing wires 114, respectively.

In the first embodiment of this invention, the first connection patterns 110, and the first and second routing wires 112 and 114 are formed on a substrate 100 through a same process and are made of a same material. In other embodiments, the first connection patterns 110, and the first and second routing wires 112 and 114 may be formed of different materials. Each of the first connection patterns 110 and the first and second routing wires 112 and 114 include one of Al, AlNd, Mo, MoTi, Cu, CuOx and Cr. Because these materials have a low resistivity, it is possible to lower contact resistance between the first and second electrode patterns 131 and 136 and the first connection pattern 110 or routing wires 112 and 114. Because ITO has high resistivity and should have a thick thickness, it is difficult to use ITO as a routing wire, and thus ITO is not used in the first embodiment of this invention. However, the ITO may be used if desired.

Further, it is preferable, though not necessary, that the first connection patterns 110 connecting the neighboring first electrode patterns are formed to have a thickness of about 2,000 Å to about 3,000 Å and a width of about 3 μm to about 10 μm. If a thickness of the first connection patterns 110 is less than 2,000 Å, the resistance of the first connection patterns 110 is high, and if a thickness of the first connection patterns 110 is larger than 3,000 Å, a step difference of a pattern increases. Also, if a width of the first connection patterns 110 is less than 3 μm, the resistance of the first connection patterns 110 is high, and if a width of the first connection patterns 110 is larger than 10 μm, the pattern may be visible.

Further, in the first embodiment, because the first connection patterns 110 and the first and second routing wires 112 and 114 are formed through one same mask process, one mask process can be omitted, compared with the related art that forms a connection pattern for connecting electrode patterns and routing wires in a two mask processes. Accordingly, it is possible to reduce a cost and a tact time (manufacturing time required per product unit for achieving a daily production target amount).

In the first embodiment of this invention, an insulation layer 120 is formed on the substrate 100 in which the first connection patterns 110 and the first and second routing wires 112 and 114 are formed, and in the insulation layer 120, first and second contact holes 120a and 120b for exposing portions of each of the first connection patterns 110, a third contact hole 120c for exposing one portion of the first routing wires 112 and a fourth contact hole 120d (see FIG. 8A) for exposing one portion of the second routing wires 114 are formed. The insulation layer 120 includes silicon nitride (SiNx). If a thickness of the insulation layer 120 is less than 5,000 Å, the insulation layer 120 may be destroyed or damaged by a voltage applied to the first electrode serial 130 and the second electrode serial 135. Therefore, in order to prevent or reduce a phenomenon in which a failure occurs due to destruction or damage of the insulation layer 120 while using the touch screen panel, it is preferable, though not required, to form the insulation layer so that a thickness of the insulation layer is about 5,000 Å or more.

Further, if a thickness of the insulation layer 120 is about 6,000 Å, a saturation state in which a transmittance no longer increases is observed and a color transition phenomenon becomes a minimum. That is, in view of a transmittance and chromaticity expression, when a thickness of the insulation layer 120 is 6,000 Å or more, a transmittance becomes a maximum and a color transition phenomenon becomes a minimum and thus it is most preferable that the insulation layer 120 has a thickness of 6,000 Å or more. However, if a thickness of the insulation layer 120 exceeds 7,000 Å, it is difficult to form a contact hole and more process time is required due to a characteristic of a silicon nitride layer used as a material of the insulation layer 120. Therefore, when considering stability of the insulation layer 120, a good light transmittance, and chromaticity expression ability together, it is most preferable, though not required, to form a thickness of the insulation layer 120 in a range of 5,000 Å to 7,000 Å, but it is possible to form a thickness of the insulation layer 120 in a range of 5,000 Å to 10,000 Å.

Further, a plurality of first electrode serials 130 and a plurality of second electrode serials 135 are formed on the insulation layer 120 in which the first to fourth contact holes 120a, 120b, 120c, and 120d (see FIG. 8A) are formed. Each of the plurality of first electrode serials 130 includes a plurality of first electrode patterns 131 and is optionally arranged in a first direction (for example, an x-axis direction). Each of the plurality of second electrode serials 135 includes a plurality of second electrode patterns 136 and is optionally arranged in a second direction (for example, a y-axis direction) intersecting the first direction. Preferably, the first and second directions are perpendicular to each other, but may also intersect at an angle less than 90 degrees. Because the first electrode patterns 131 forming the first electrode serial 130 are separated from each other, the first electrode patterns 131 are connected to the portions of the first connection pattern 110 exposed through the first and second contact holes 120a and 120b formed in the insulation layer 120, and the first electrode patterns 131 positioned at the outermost side are connected to the first routing wires 112 exposed through the third contact hole 120c.

As shown in FIG. 6, portions of the plurality of first electrode patterns 131 are formed in the contact holes 120a, 120b and 120c so that the portions of the plurality of first electrode patterns 131 are partially filled in the contact holes 120a, 120b and 120c. For example, the portions of the plurality of first electrode patterns 131 are formed on side walls of the contact holes 120a, 120b and 120c, and on exposed portions of the first connection patterns 110 and the first routing wires 112. Accordingly, hollows or cavities 122a, 122b, and 122c are respectively formed by the portions of the plurality of first electrode patterns 131 being partially filled in the contact holes 120a, 120b and 120c.

Figure 8A:
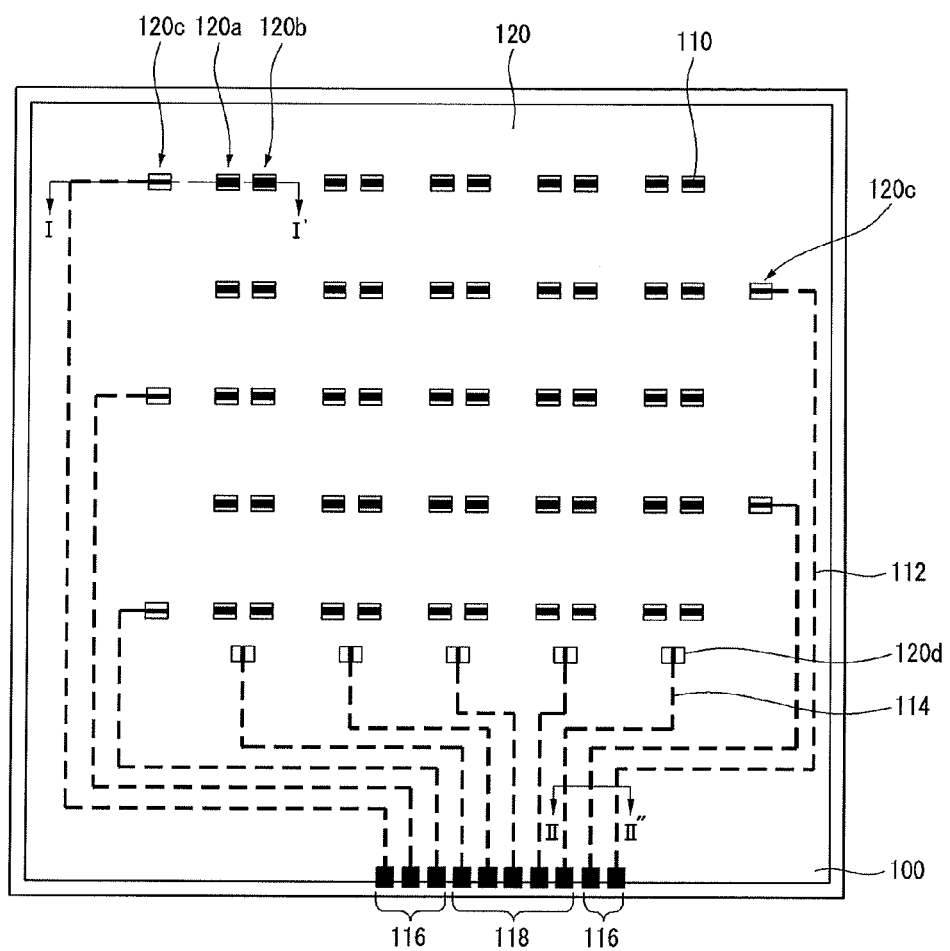
FIGS. 8A to 8D are a top plan view and cross-sectional views illustrating a second mask process of processes of manufacturing the touch screen panel shown in FIG. 5.

The second electrode patterns 136 forming the second electrode serial 135 are integrally formed with the second connection patterns 137 and are connected to the second routing wires 114 exposed through the fourth contact hole 120d (see FIG. 8A). The first and second electrode patterns 131 and 136 and the second connection patterns 137 are made of the same material through the same process. The first and second electrode patterns 131 and 136 and the second connection patterns 137 are made of a transparent metal material such as ITO or IZO. In the first embodiment, because the first and second electrode serials 130 and 135 and the second connection patterns 137 using ITO or IZO are formed in a top layer of the touch screen panel and ITO or IZO has very high hardness, a scratch does not occur in a subsequent process of forming a display device on the other surface of the substrate 100 of the touch screen panel, and thus a touch screen panel having a good quality is obtained.

Hereinafter, a method of manufacturing a capacitive type touch screen panel according to the example embodiment of this invention will be described with reference to FIGS. 7A to 9B.

Figure 7A:
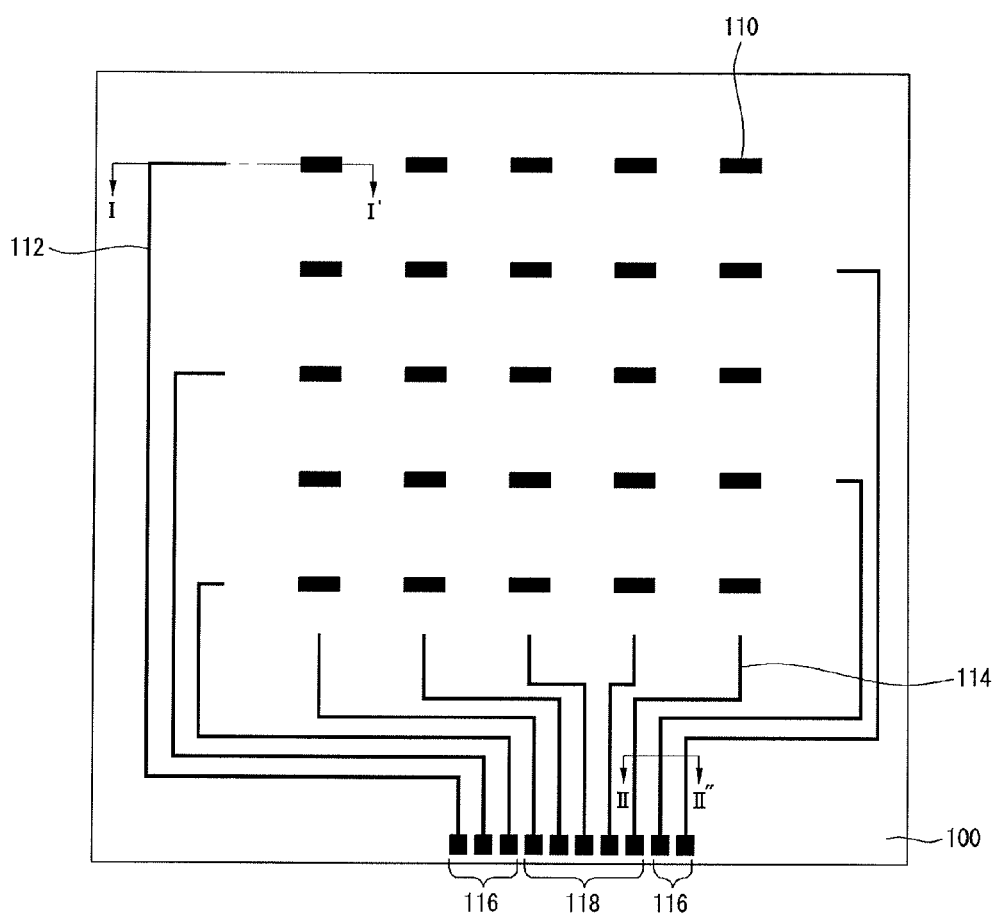
FIGS. 7A and 7B are a top plan view and a cross-sectional view illustrating a first mask process of processes of manufacturing the touch screen panel shown in FIG. 5.
Figure 7B:
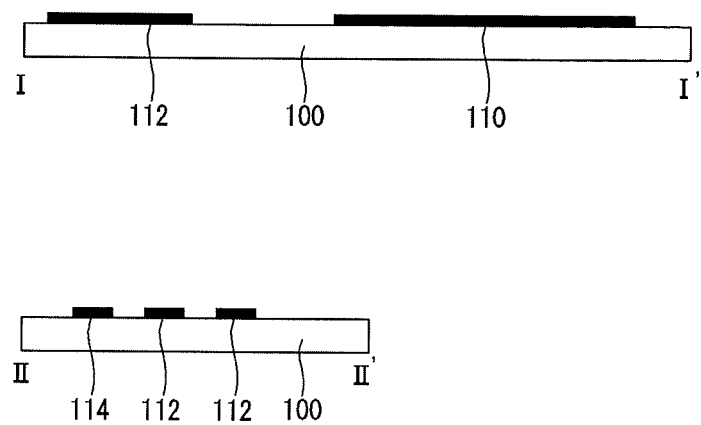

FIGS. 7A and 7B are a top plan view and a cross-sectional view illustrating a first mask process in the method of manufacturing the touch screen panel according to the first embodiment of this invention.

Referring to FIGS. 5, 7A, and 7B, a first conductive pattern group including first connection patterns 110, first routing wires 112, and second routing wires 114 is formed on the substrate 100 including an electrode forming part A, the routing wire forming part B, and the pad forming part C using the first mask process.

In more detail, a first conductive layer is entirely deposited on the substrate 100 through a deposition process such as a sputtering method. As the first conductive layer is patterned with a photolithography process and an etching process using a first mask, the first conductive pattern group including the first connection patterns 110, the first routing wires 112, and the second routing wires 114 is formed. Here, as a material forming the first conductive pattern group, Al, AlNd, Mo, MoTi, Cu, CuOx, Cr, ITO and so on are used. The first connection pattern 110 formed in the electrode forming part A (see FIG. 5) is formed to have a thickness of about 2,000 Å to about 3,000 Å and a width of about 3 μm to about 10 μm.

In another embodiment, the first conductive pattern group including the first connection patterns 110, the first routing wires 112, and the second routing wires 114 may be formed by being printed on the substrate 100. Subsequent drying and/or heating process may be performed. In such a case, the photolithography process and the etching process using the first mask may be omitted. In other embodiments, other pattern forming processes may be used.

FIGS. 8A to 8D are a top plan view and cross-sectional views illustrating a second mask process in a method of manufacturing the touch screen panel according to the first embodiment of this invention. The first and second routing wires 112 and 114 indicated by dotted lines in FIG. 8A because they are covered by the insulation layer 120, and the first and second routing wires 112 and 114 are portions that are not displayed in a top plan view, however for a better understanding, in this invention, the first and second routing wires 112 and 114 are indicated by dotted lines.

Figure 8B:
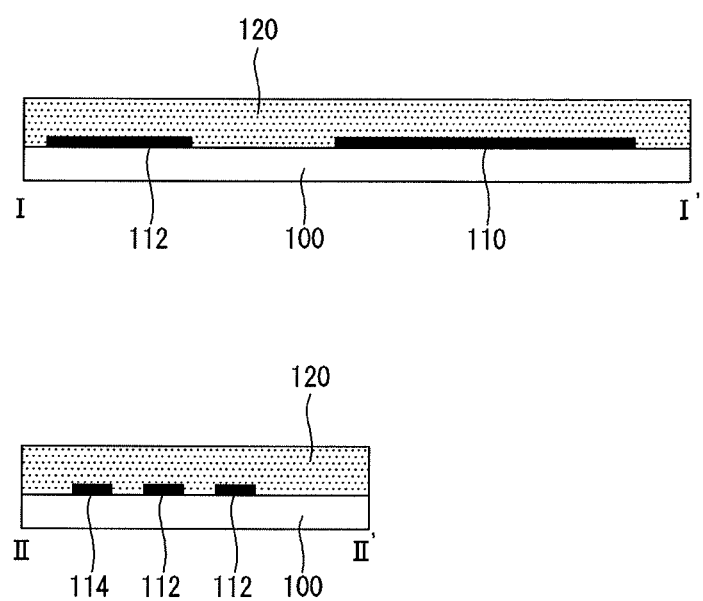

Referring to FIGS. 8A and 8B, the insulation layer 120 is formed through a deposition method such as sputtering on an entire surface of the substrate 100 in which the first conductive pattern group including the first connection patterns 110, the first routing wires 112, and the second routing wires 114 is formed. As a material of the insulation layer 120, an inorganic insulation material such as silicon nitride (SiNx) is used. A thickness of the insulation layer 120 is preferably set to a range of about 5,000 Å to about 10,000 Å, more preferably, though not required, to a range of about 5,000 Å to about 7,000 Å.

Figure 8C:
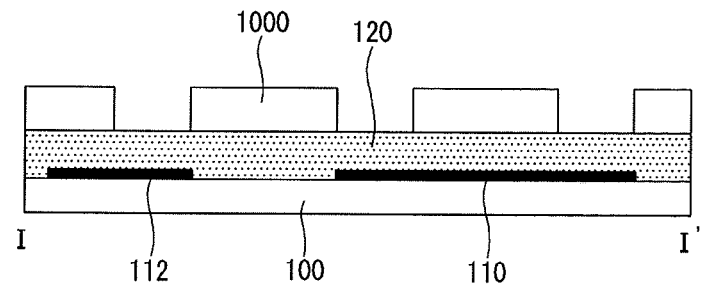
Figure 8C:
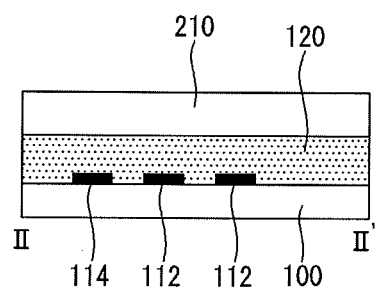
Figure 8D:
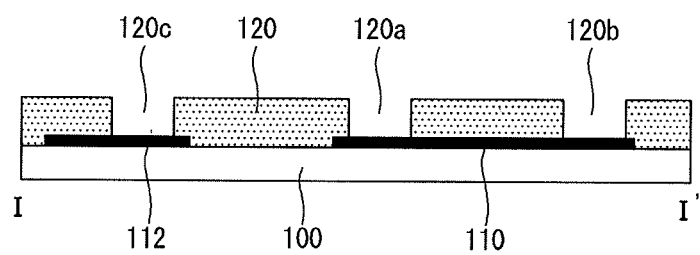
Figure 8D:
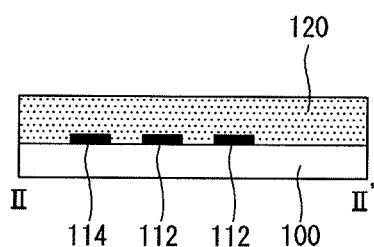

After the insulation layer 120 is formed, as shown in FIG. 8C, a photoresist pattern 1000 is formed on a portion in which the insulation layer 120 should exist by a photolithography process using a second mask. First to fourth contact holes 120a, 120b, 120c and 120d (see FIG. 8A) penetrating the insulation layer 120 are formed with a dry etching process using the photoresist pattern 1000. Next, when the photoresist pattern 1000 is removed, as shown in FIG. 8D, first to fourth contact holes 120a, 120b, 120c and 120d for exposing the first conductive pattern group 110, 112 and 114 are formed. Here, the first contact hole 120a exposes a portion of the first connection pattern 110, the second contact hole 120b exposes another portion of the first connection pattern 110, the third contact hole 120c exposes a portion of the first routing wire 112, and the fourth contact hole 120d (see FIG. 8A) exposes a portion of the second routing wire 114.

In the first embodiment of this invention, a cross section that is perpendicular to an axial direction of at least one of the first to fourth contact holes 120a, 120b, 120c, and 120d may be any shape. A rectangular shape is shown in FIG. 8A, but the first embodiment of the invention may include circular, oval, polygonal, or irregular shapes. Additionally, a depth of at least one of the hollows or cavities 122a, 122b, and 122c may be about 2,000 Å to about 9,000 Å in the axial direction depending on a thickness of the insulation layer 120 and at thickness of the pluralities of first and second electrode patterns.

Figure 9A:
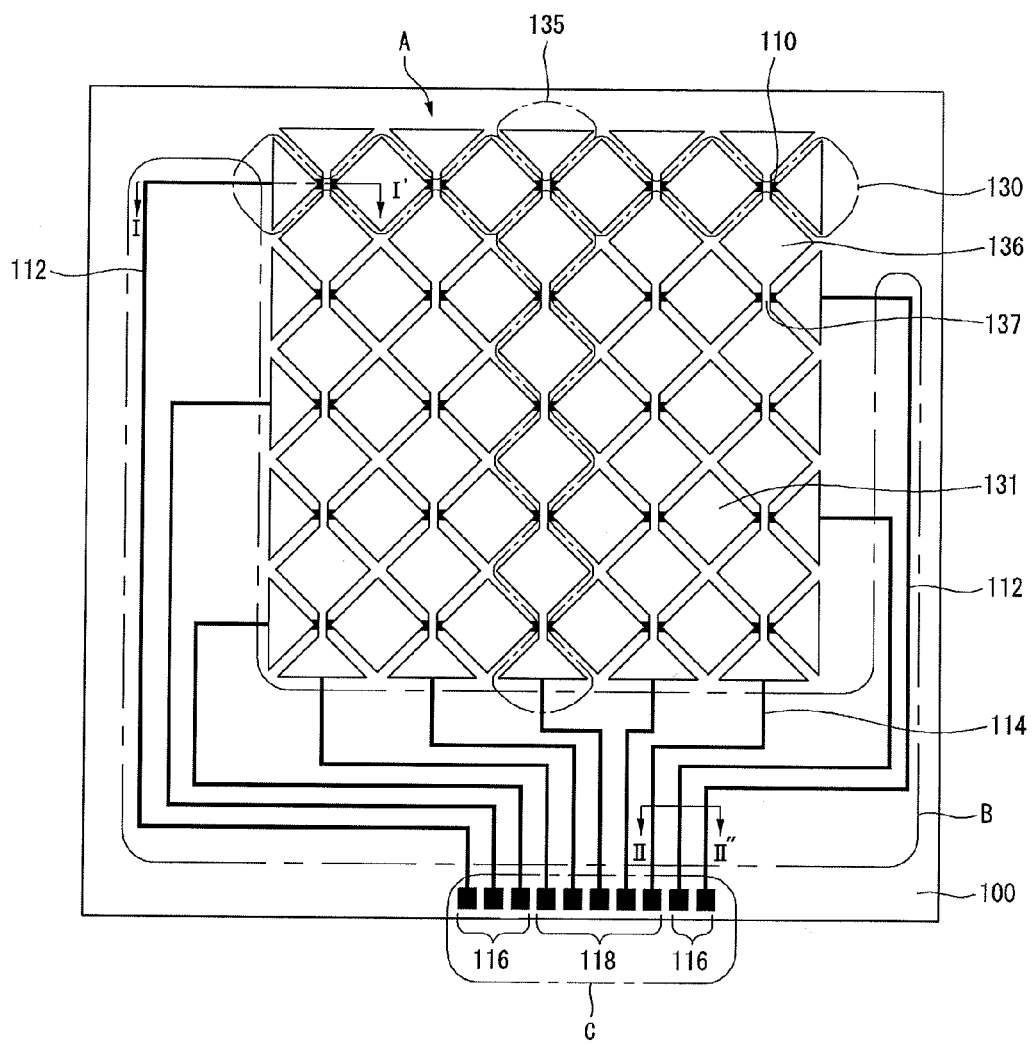
FIGS. 9A and 9B are a top plan view and a cross-sectional view illustrating a third mask process of a processes of manufacturing the touch screen panel shown in FIG. 5.
Figure 9B:
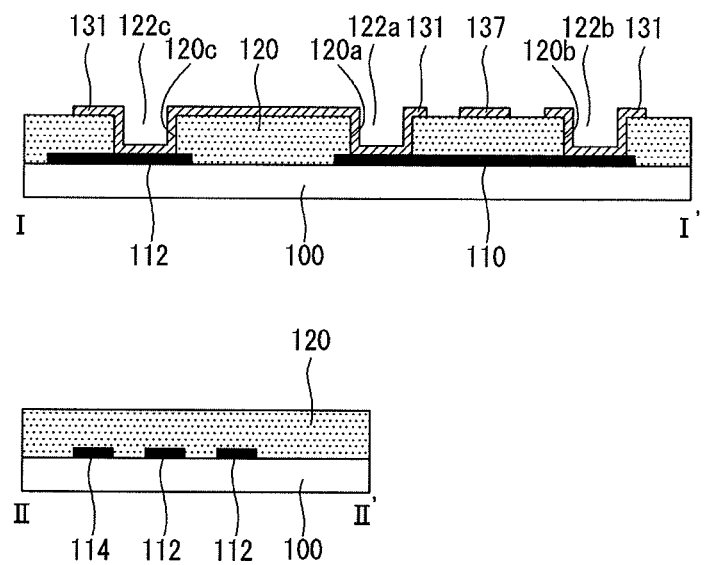

FIGS. 9A to 9B are a top plan view and a cross-sectional view illustrating a third mask process in the method of manufacturing the capacitive type touch screen panel according to the example embodiment of this invention. FIG. 9A is a top plan view illustrating the third mask process in the method of manufacturing the capacitive type touch screen panel according to the example embodiment of this invention, and for a better understanding, in FIG. 9A, the insulation layer 120 formed between the first conductive pattern group and a second conductive pattern group which will be described later is not depicted.

Referring to FIGS. 9A and 9B, the second conductive pattern groups including a plurality of first electrode serials 130 and a plurality of second electrode serials 135 formed on the insulation layer 120 in which the first to fourth contact holes 120a, 120b, 120c, and 120d (see FIG. 8A) are formed using the third mask process. The plurality of first electrode serials 130 are optionally arranged in parallel in a first direction (for example, an x-direction). And the plurality of second electrode serials 135 are optionally arranged in parallel in a second direction (for example, a y-direction) intersecting the first direction.

In more detail, a second conductive layer is deposited through a deposition process such as sputtering on an entire surface of the insulation layer 120 in which the first to fourth contact holes 120a, 120b, 120c, and 120d (see FIG. 8A) are formed. Thereafter, the second conductive layer is patterned with a photolithography process and an etching process using a third mask to form the second conductive pattern group including a plurality of first electrode serials 130 arranged parallel in the first direction (for example, an x-direction) and a plurality of second electrode serials 135 arranged parallel in the second direction (for example, a y-direction) intersecting the first direction. Here, each of the first electrode serials 130 includes the plurality of first electrode patterns 131, and each of the second electrode serials 135 includes the plurality of second electrode patterns 136 and the second connection patterns 137 for connecting neighboring second electrode patterns 136. As a material of the second conductive layer, ITO or IZO is used, and if a thickness thereof is about 1,200 Å to about 1,600 Å, a maximum transmittance can be obtained.

Also, as shown in FIG. 9B, portions of the plurality of first electrode patterns 131 are deposited in the contact holes 120a, 120b and 120c so that the portions of the plurality of first electrode patterns 131 are partially filled in the contact holes 120a, 120b and 120c. For example, portions of the plurality of first electrode patterns 131 are deposited on side walls of the contact holes 120a, 120b and 120c, and on exposed portions of the first connection patterns 110 and the first routing wires 112. Accordingly, hollows or cavities 122a, 122b, and 122c are respectively formed by the portions of the plurality of first electrode patterns 131 being partially filled in the contact holes 120a, 120b and 120c.

Here, each of the first and second electrode patterns 131 and 136 is formed in a triangle, a rectangle, a square, a quadrangle, a diamond, a polygon shape and so on, but a shape of the first and second electrode patterns 131 and 136 is not limited thereto and may include other random shapes. Further, in the first embodiment of this invention, the first electrode patterns 131 formed on the insulation layer 120 are separated, and the second electrode patterns 136 are integrally formed with the second connection pattern 137, but the first electrode patterns 131 may be integrally formed with a connection pattern on the insulation layer 120, and the second electrode patterns 136 may be separated. In this later instance, the second electrode patterns are electrically connected by another connection pattern formed between the insulation layer and the substrate.

Figure 9C:
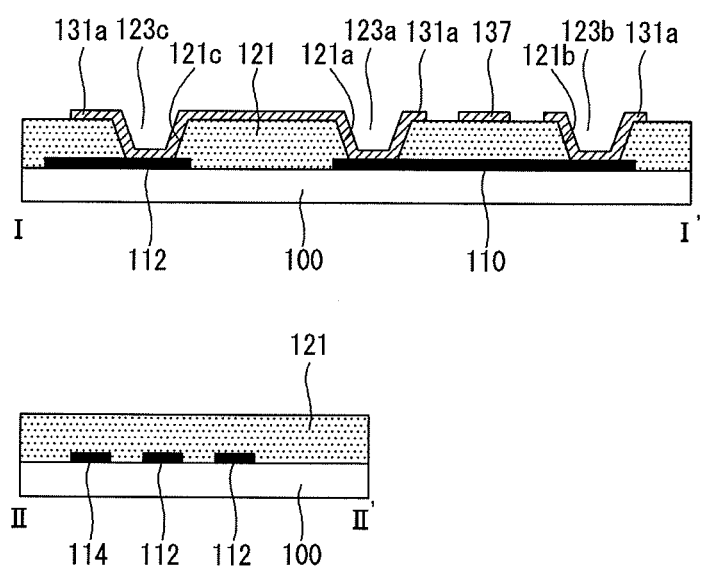
FIG. 9C is a cross-sectional view illustrating another electrostatic capacitive touch screen panel obtained after second and third mask processes of processes of manufacturing the touch screen panel shown in FIG. 5.

FIG. 9C is a cross-sectional view illustrating another touch screen panel obtained after second and third mask processes of processes of manufacturing the touch screen panel shown in FIG. 5. The touch screen panel shown FIG. 9C is similar to the touch screen panel shown in FIG. 9B excepting the first to fourth contact holes. In the touch screen panel shown in FIG. 9B, the insulation layer 120 includes first and second contact holes 121$a$ and 121$b$ exposing portions of the first connection pattern 110, third contact holes 121$c$ exposing portions of the first routing wires 112, and fourth contact holes (not shown) exposing portions of the second routing wire 114. The first to fourth contact holes of the touch screen panel shown in FIG. 9C are different from that of touch screen panel shown in FIG. 9C in that inner walls of the first to fourth contact holes are slanted to a bottom of each contact holes. The slant angle of the contact hole has a range of about 30° to about 90°, but is not limited thereto and may be formed in the insulation layer 121.

As shown in FIG. 9C, portions of the plurality of first electrode patterns 131 are deposited in the contact holes 121$a$, 121$b$ and 121$c$ so that the portions of the plurality of first electrode patterns 131$a$ are partially filled in the contact holes 121$a$, 121$b$ and 121$c$. For example, portions of the plurality of first electrode patterns 131$a$ are deposited on side walls of the contact holes 121$a$, 121$b$ and 121$c$, and on exposed portions of the first connection patterns 110 and the first routing wires 112.

Accordingly, hollows or cavities 123$a$, 123$b$, and 123$c$ are respectively formed by the portions of the plurality of first electrode patterns 131$a$ being partially filled in the contact holes 121$a$, 121$b$ and 121$c$.

Next, a pad forming part C including a plurality of first pads 116 and a plurality of second pads 118 is formed. The plurality of first pads 116 are connected to the plurality of first electrode serials 130 through the plurality of first routing wires 112, respectively, and the plurality of second pads 118 are connected to the plurality of second electrode serials 135 through the plurality of second routing wires 114, respectively.

According to the example embodiment of this invention, because the first connection patterns 110 and the first and second routing wires 112 and 114 are formed through the same process, at least one mask process may be omitted. Therefore, a cost can be reduced and a tact time can be reduced according to reduction of the number of masks.

Further, in the first embodiment of this invention, because silicon nitride (SiNx) is used as the insulation layer 120, a visibility problem occurring due to a color difference between the insulation layer 120 and a periphery thereof can be solved or reduced. Because a thickness of the insulation layer 120 is set to a range of 5,000 Å to 10,000 Å, a transmittance becomes a maximum and a color transition phenomenon becomes a minimum and thus a destruction or damage phenomenon of the insulation layer 120 can be suppressed. Therefore, stability of the touch screen panel can be remarkably improved.

Figure 10:
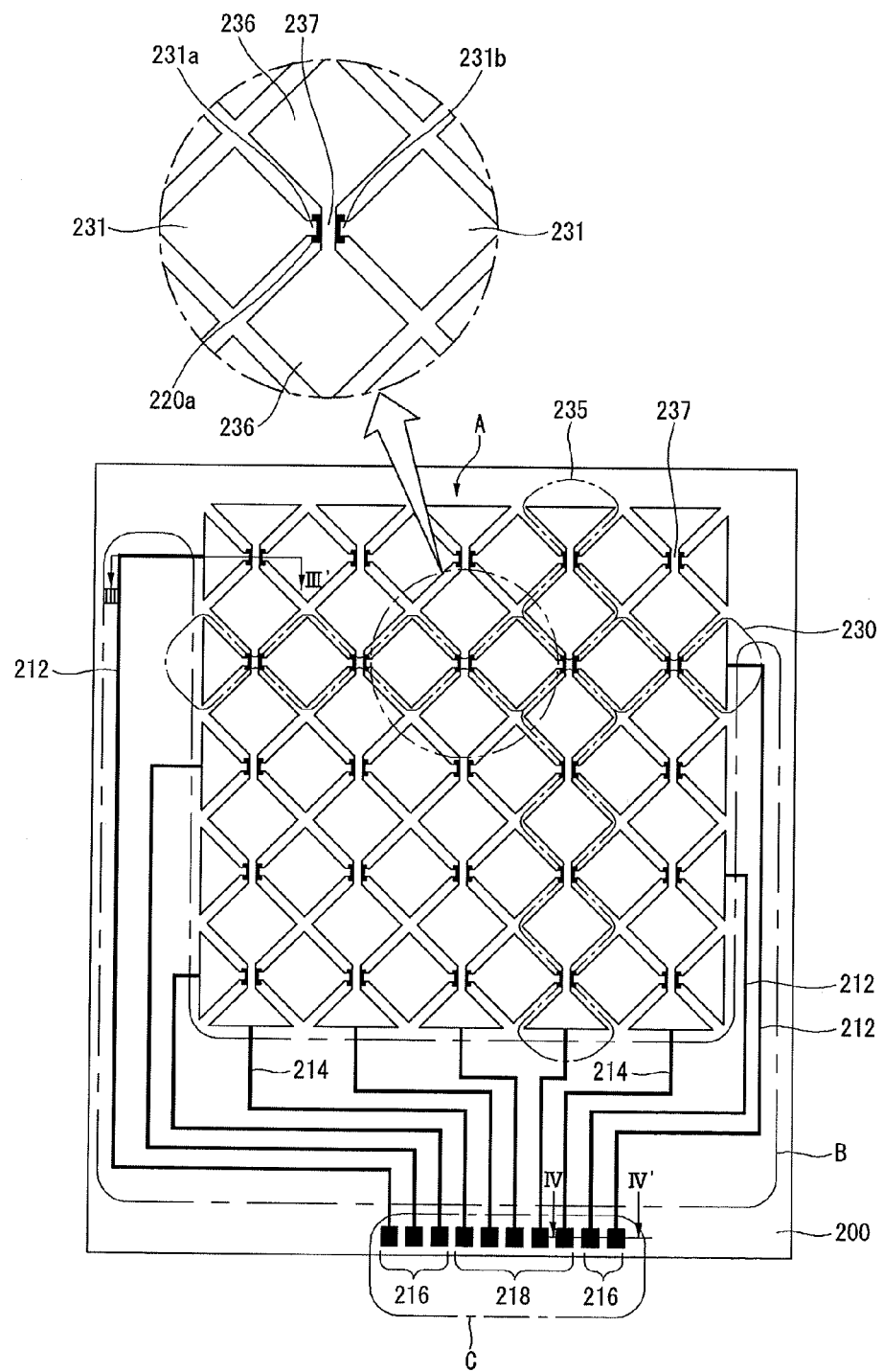
FIG. 10 is a top plan view illustrating an electrostatic capacitive touch screen panel according to a second embodiment of this invention.

An electrostatic capacitive touch screen panel according to a second embodiment of this invention will be described with reference to FIGS. 10 and 11. FIG. 10 is a top plan view illustrating the touch screen panel according to the second embodiment of this invention, and FIG. 11 is a cross-sectional view illustrating the touch screen panel taken along line III-III' and line IV-IV' of FIG. 10.

Figure 11:
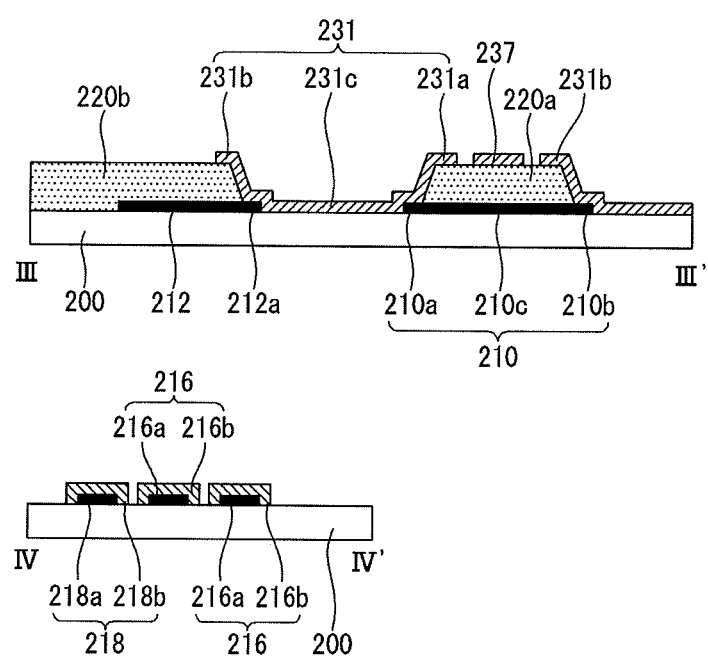
FIG. 11 is a cross-sectional view illustrating the touch screen panel taken along line III-III' and line IV-IV' of FIG. 10.

Referring to FIGS. 10 and 11, the touch screen panel according to the second embodiment of this invention includes an electrode forming part A, a routing wire forming part B, and a pad forming part C.

The electrode forming part A includes a plurality of first electrode serials 230 optionally arranged in parallel in a first direction (for example, an X-axis direction) and a plurality of second electrode serial 235 optionally arranged in parallel in a second direction (for example, an Y-axis direction) to intersect with the first direction. Each of the first electrode serials 230 includes first electrode patterns 231 having a triangular shape, a rectangular shape, a square shape, a quadrangle shape, a diamond shape, a polygon shape, and so on, and first connection patterns 210 for connecting neighboring first electrode patterns 231. Each of the second electrode serials 235 includes second electrode patterns 236 having a triangular shape, a rectangular shape, a square shape, a quadrangle shape, a diamond shape, a polygon shape, and so on, similar to the first electrode patterns 131 and second connection patterns 237 for connecting neighboring second electrode patterns 236.

In the second embodiment of this invention, the first connection patterns 210 are formed separately from the first electrode patterns 231, and the second connection patterns 237 are integrally formed with the second electrode patterns 236. Alternatively, the first connection patterns may be integrally formed with the first electrode patterns, and the second connection patterns may be formed separately from the second electrode patterns.

The routing wire forming part B is formed on the substrate 200 at positions outside the electrode forming part A, and includes a plurality of first routing wires 212 connected to the plurality of first electrode serials 230, respectively and a plurality of second routing wires 214 connected to the plurality of second electrode serials 235, respectively.

The pad forming part C includes a plurality of first pads 216 connected to the plurality of first electrode serials 230 through the plurality of first routing wires 212, respectively, and a plurality of second pads 218 connected to the plurality of second electrode serials 235 through the plurality of second routing wires 214, respectively.

In the second embodiment of this invention, the first connection patterns 210, and the first and second routing wires 212 and 214 are formed on a substrate 200 through a same process and are made of a same material. In other embodiments, the first connection patterns 210, and the first and second routing wires 212 and 214 may be formed of different materials. Each of the first connection patterns 210 and the first and second routing wires 212 and 214 includes one of Al, AlNd, Mo, MoTi, Cu, CuOx and Cr. Because these materials have a low resistivity, it is possible to lower contact resistance between the first and second electrode patterns 231 and 236 and the first connection pattern 210 or routing wires 212 and 214. Because ITO has high resistivity and should have a thick thickness, it is difficult to use ITO as a routing wire, and thus ITO is not used in the second embodiment of this invention. However, the ITO may be used if desired.

Further, it is preferable, though not necessary, that the first connection patterns 210 connecting the neighboring first electrode patterns 231 are formed to have a thickness of about 2,000 Å to about 3,000 Å and a width of about 3 μm to about 10 μm. If a thickness of the first connection patterns 210 is less than 2,000 Å, the resistance of the first connection patterns 210 is high, and if a thickness of the first connection patterns 210 is larger than 3,000 Å, a step difference of a pattern increases. Also, if a width of the first connection patterns 210 is less than 3 μm, the resistance of the first connection patterns 210 is high, and if a width of the first connection patterns 210 is larger than 10 μm, the pattern is visible.

Further, in the second embodiment of this invention, because the first connection patterns 210 and the first and second routing wires 212 and 214 are formed through one same mask process, one mask process can be omitted, compared with the related art that forms the first connection pattern for connecting the first electrode patterns and the routing wires in a two mask processes. Accordingly, it is possible to reduce a cost and a tact time.

In the second embodiment of this invention, first insulation patterns 220a are formed in the electrode forming part A to expose a first and second portions 210a and 210b of the first connection patterns 210 and to insulate the first connection patterns 210 from the second connection patterns 237. Each of the first electrode patterns 231 includes a first portion 231a formed on a first portion 210a of the first connection pattern 210, a second portion 231b formed on a second portion 210b of the first connection pattern 210 and a middle portion 231c formed on the substrate 200. Accordingly, neighboring first electrode patterns 231 are electrically connected to each other by the connection patterns 210. In the FIG. 11, the first and second portions 231a and 231b of the first electrode pattern 231 are formed on the first and second portions 212a and 212b of the first connection pattern 212 and side wall and upper surface of the insulation pattern 220b, but this invention is not limited thereto. For example, the first and second portions 231a and 23 lb of the first electrode pattern 231 may be formed on the first and second portions 212a and 212b of the first connection pattern 212 or the first and second portions 212a and 212b of the first connection pattern 212 and the side wall of the insulation pattern 220b. However, if the first and second portions 231a and 231b of the first electrode pattern 231 are formed on the first and second portions 210a and 210b of the first connection pattern 210 and side wall and upper surface of the first insulation pattern 220a as shown in FIG. 11, a process margin which corresponds to a length from the side wall and the upper surface of the first insulation pattern 220a can be secured. Accordingly, although misalignment exists at a process of patterning the first and second electrode patterns 231 and 236, it is possible to appropriately assure electrical contact between the first electrode patterns 231 and the first connection pattern 210.

In the second embodiment of this invention, second insulation patterns 220b are formed in the routing wire forming part B to expose a portion 212a of the first routing wire 212 and a portion (not shown) of the second routing wire 214. The second portion 231b of the first electrode pattern 231 at outmost of the electrode forming part A is formed on a portion 212a of the first routing wire 212 and side wall and upper surface of the second insulation pattern 220b. A portion of the second electrode pattern 236 at outmost of the electrode forming part A is also formed on a portion (not shown) of the second routing wire 214 and side wall and upper surface of the second insulation pattern 220b.

Also, as shown in FIG. 11, any insulation pattern is not formed on first and second pads 216 and 218 so that they are electrically connected to external circuits. However, it is possible to form insulation patterns on the first and second pads 216 and 218 if the insulation pattern is formed on them and the insulation pattern has contact holes to expose portions of the first and second pads 216 and 218.

The first and second insulation patterns 220a and 220b includes silicon nitride (SiNx). If a thickness of the first insulation pattern 220a is less than 5,000 Å, the first insulation pattern 220a may be destroyed or damaged by a voltage applied to the first electrode serial 230 and the second electrode serial 235. Therefore, in order to prevent or reduce a phenomenon in which a failure occurs due to destruction or damage of the first insulation pattern 220a while using the touch screen panel, it is preferable, though not required, to form the first insulation pattern 220a so that a thickness of the insulation pattern 220a is about 5,000 Å or more. Further, if a thickness of the first insulation pattern 220a is about 6,000 Å, a saturation state in which a transmittance no longer increases is observed and a color transition phenomenon becomes a minimum. That is, in view of a transmittance and chromaticity expression, when a thickness of the first insulation pattern 220a is 6,000 Å or more, a transmittance becomes a maximum and a color transition phenomenon becomes a minimum and thus it is most preferable that the first insulation pattern 220a has a thickness of 6,000 Å or more. However, if a thickness of the first insulation pattern 220a exceeds 7,000 Å, it is difficult to remove a portion of insulation layer 220 in the electrode forming part A, and much more process time is required due to a characteristic of a silicon nitride layer used as a material of the insulation layer 220. Therefore, when considering stability of the insulation layer 220, a good light transmittance, and chromaticity expression ability together, it is most preferable, though not required, to form a thickness of the first insulation pattern 220a in a range of 5,000 Å to 7,000 Å, but it is possible to form a thickness of the insulation layer 220 in a range of 5,000 Å to 10,000 Å.

The first and second electrode patterns 231 and 236 and the second connection patterns 237 are made of the same material through the same process. The first and second electrode patterns 231 and 236 and the second connection patterns 237 are made of a transparent metal material such as ITO or IZO. In the second embodiment of this invention, because the first and second electrode serials 230 and 235 and the second connection patterns 237 formed on a top layer of the touch screen panel are made of ITO or IZO, and ITO or IZO has very high hardness, a scratch does not occur in a subsequent process of forming a display device on the other surface of the substrate 200 of the touch screen panel, and thus a touch screen panel of a good quality is obtained.

Hereinafter, a method of manufacturing the touch screen panel according to the second embodiment of this invention will be described with reference to FIGS. 12A to 14B.

Figure 12A:
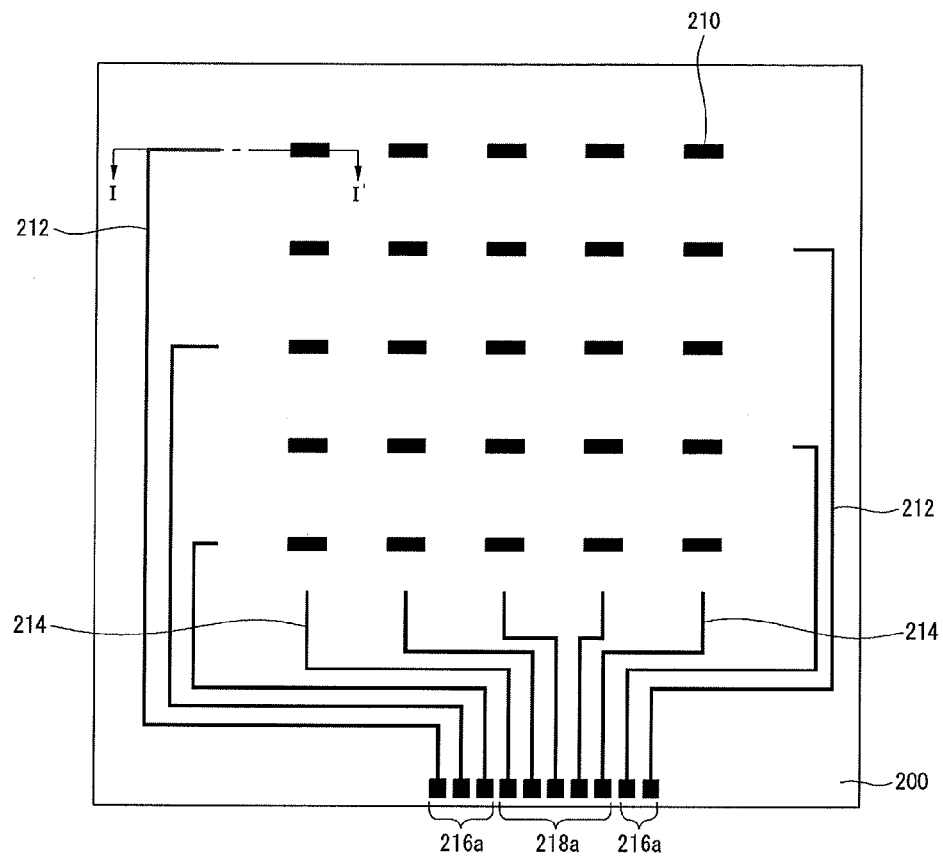
FIGS. 12A and 12B are a top plan view and a cross-sectional view illustrating a first mask process of processes of manufacturing the touch screen panel shown in FIG. 10.
Figure 12B:

FIGS. 12A and 12B are a top plan view and a cross-sectional view illustrating a first mask process in the method of manufacturing the touch screen panel according to the second embodiment of this invention.

Referring to FIGS. 10, 12A, and 12B, a first conductive pattern group including first connection patterns 210, first routing wires 212, second routing wires 214, lower patterns 216a of first pads and lower patterns 218a of second pads is formed on the substrate 200 which includes an electrode forming part A, a routing wire forming part B and a pad forming part C using the first mask process.

In more detail, a first conductive layer is deposited on the substrate 200 through a deposition process such as a sputtering method. As the first conductive layer is patterned with a photolithography process and an etching process using a first mask, the first conductive pattern group including the first connection patterns 210, the first routing wires 212, the second routing wires 214, the lower patterns 216*a* of the first pads and the lower patterns 218*a* of the second pads is formed. Here, as a material forming the first conductive pattern group, Al, AlNd, Mo, MoTi, Cu, CuOx, Cr and so on are used. The first connection pattern 210 formed in the electrode forming part A (see FIG. 10) is formed to have a thickness of about 2,000 Å to about 3,000 Å and a width of about 3 µm to about 10 µm.

In another embodiment, the first conductive pattern group including the first connection patterns 210, the first routing wires 212, the second routing wires 214, the lower patterns 216*a* of the first pads and the lower patterns 218*a* of the second pads may be formed by being printed on the substrate 200. Subsequent drying and/or heating process may be performed. In such a case, the photolithography process and the etching process using the first mask may be omitted. In other embodiments, other pattern forming processes may be used.

FIGS. 13A to 13D are a top plan view and cross-sectional views illustrating a second mask process in a method of manufacturing the touch screen panel according to the second embodiment of this invention. The first and second routing wires 212 and 214 are indicated by dotted lines in FIG. 13A. The first and second routing wires 212 and 214 are portions that are not displayed in a top plan view because they are covered by the second insulation pattern 220*b*, however for a better understanding, in this invention, the first and second routing wires 212 and 214 are indicated by dotted lines.

Figure 13A:
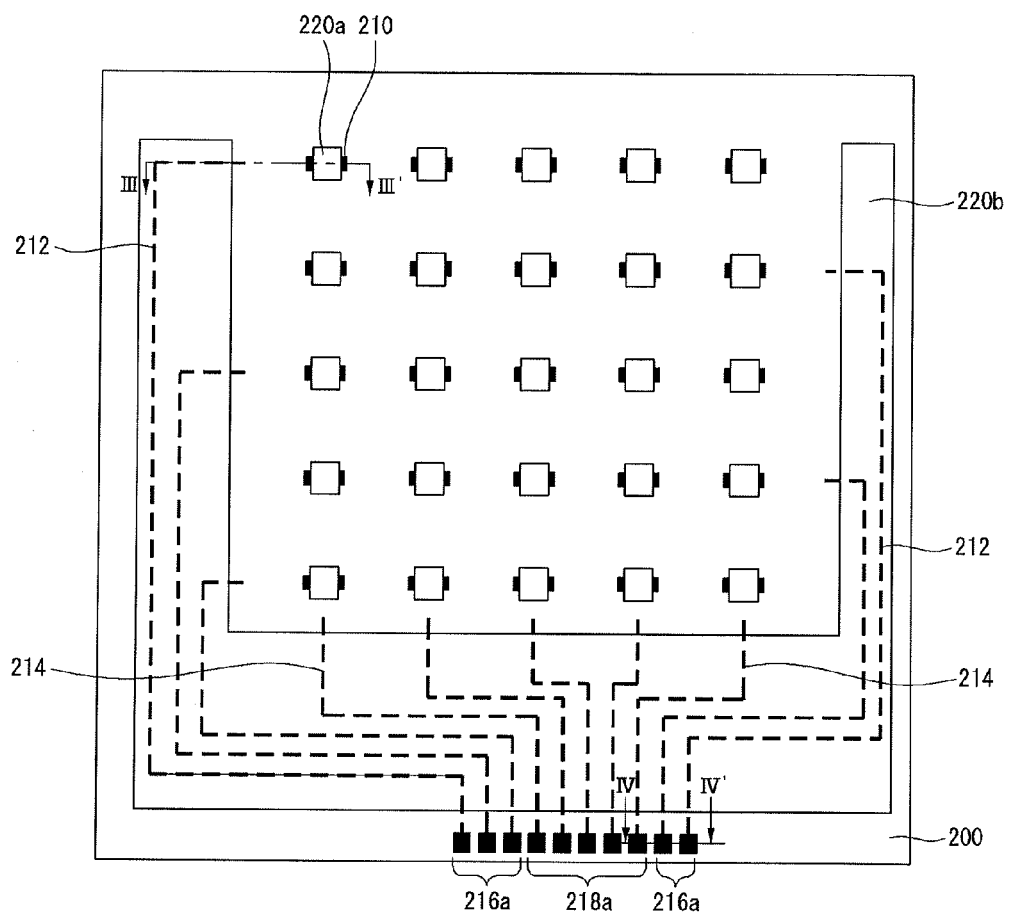
FIGS. 13A to 13D are a top plan view and cross-sectional views illustrating a second mask process of processes of manufacturing the touch screen panel shown in FIG. 10.
Figure 13B:
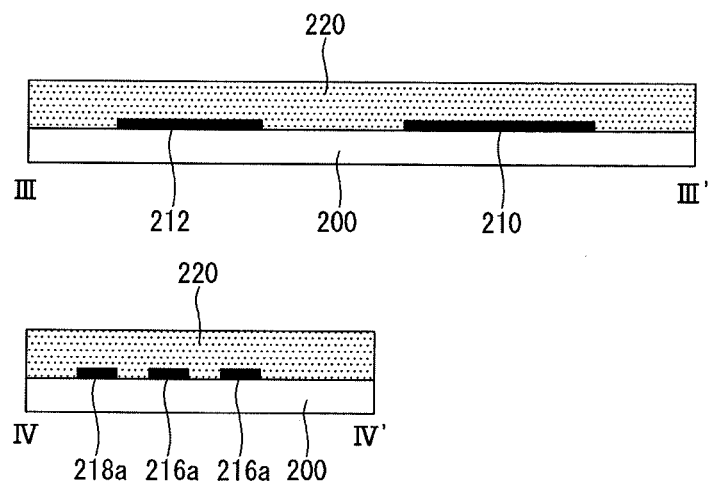

Referring to FIGS. 13A and 13B, the insulation layer 220 is formed through a deposition method such as sputtering on an entire surface of the substrate 200 on which the first conductive pattern group including the first connection patterns 210, the first routing wires 212, the second routing wires 214, the lower patterns 216*a* of the first pads and the lower patterns 218*a* of the second pads is formed. As a material of the insulation layer 220, an inorganic insulation material such as silicon nitride (SiNx) is used. A thickness of the insulation layer 220 is preferably set to a range of about 5,000 Å to about 10,000 Å, more preferably, though not required, to a range of about 5,000 Å to about 7,000 Å.

Figure 13C:
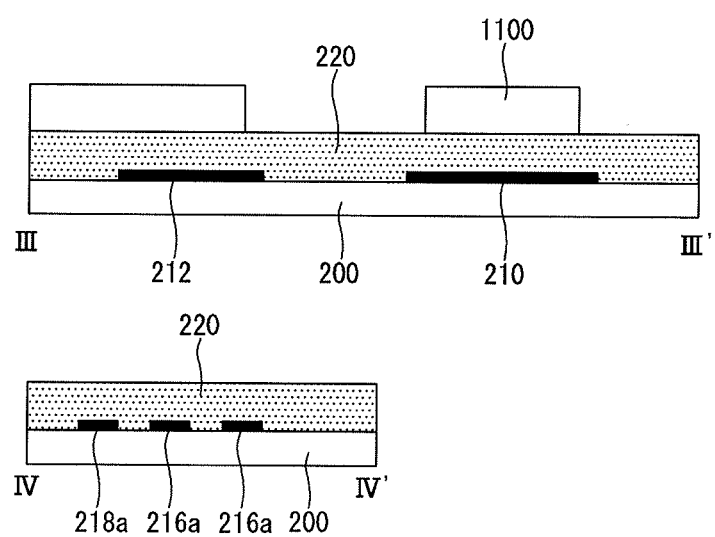
Figure 13D:
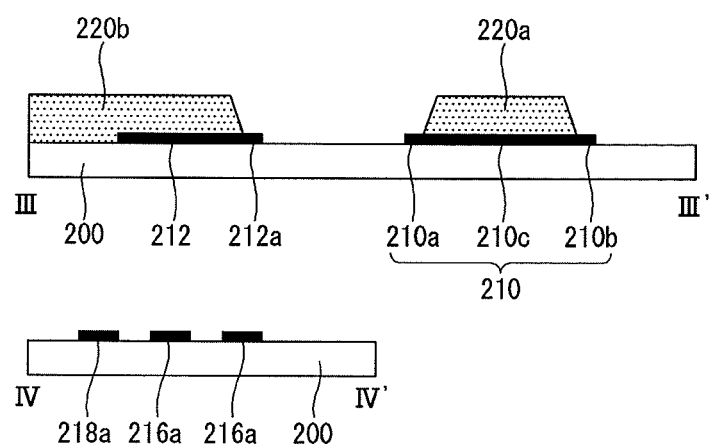

After the insulation layer 220 is formed, as shown in FIG. 13C, a photoresist pattern 1100 is formed on a portion in which the insulation layer 220 should exist by a photolithography process using a second mask. First and second insulation patterns 220*a* and 220*b* are formed with a dry etching process using the photoresist pattern 1100 as shown in FIG. 13D. The first insulation patterns 220*a* are formed on the first connection patterns 210 and the substrate 200 in the electrode forming part A to expose a first portion 210*a* and a second portion 210*b* of the first connection patterns 210. The second insulation pattern 220*b* is formed on the first and second routing wires 212 and 214 and the substrate 200 in the routing wire forming part B to expose a portion 212*a* of the first routing wire 212 and a portion (not shown) of the second routing wire 214. In the second embodiment of this invention, the lower patters 216*a* and 218*a* of the first and second pads are exposed, but this invention is not limited thereto. In another embodiment, it is possible to form the second insulation pattern on the lower patters 216*a* and 218*a* of the first and second pads 216 and 218 if the second insulation pattern has contact holes to expose the lower patters 216*a* and 218*a* of the first and second pads 216 and 218.

Figure 14A:
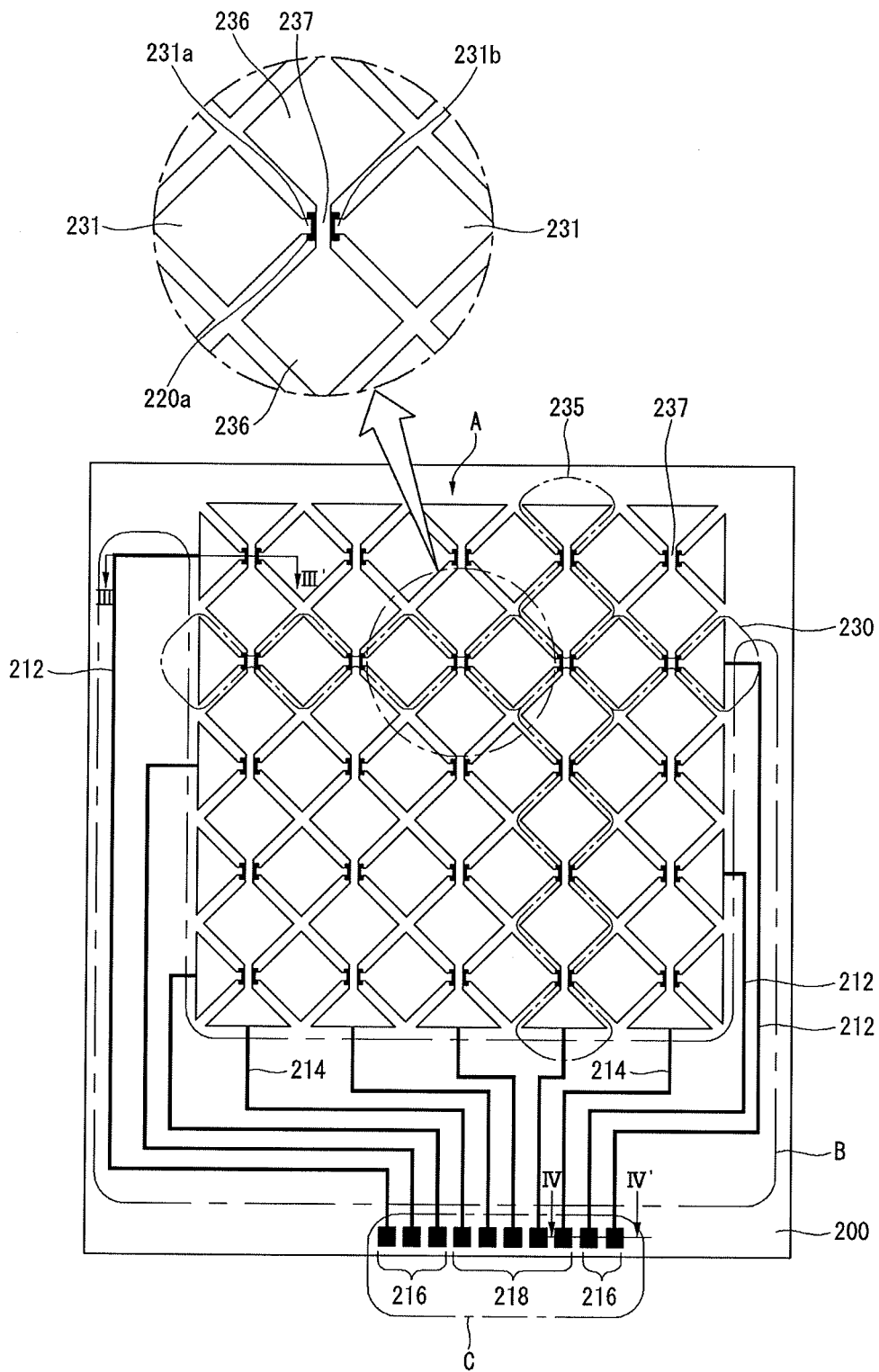
FIGS. 14A and 14B are a top plan view and a cross-sectional view illustrating a third mask process of processes of manufacturing the touch screen panel shown in FIG. 10.
Figure 14B:
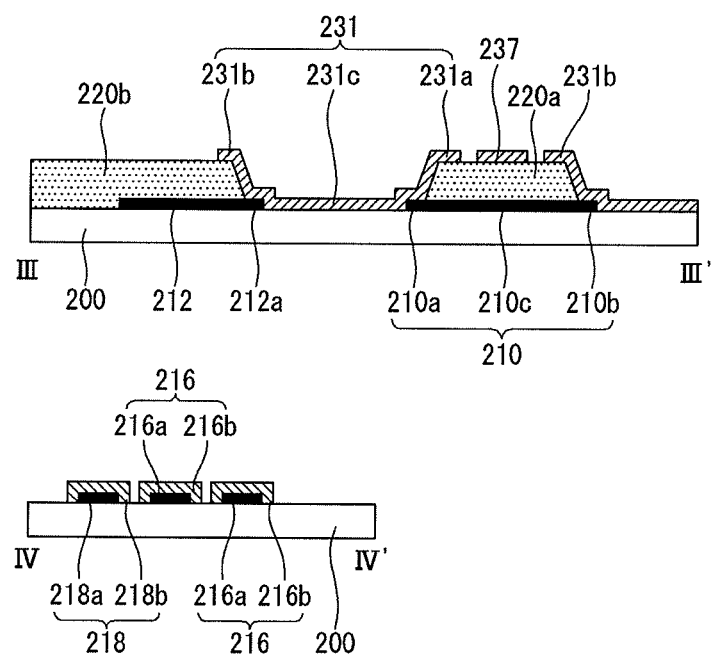

FIGS. 14A to 14B are a top plan view and a cross-sectional view illustrating a third mask process in the method of manufacturing the touch screen panel according to the second embodiment of this invention. FIG. 14A is a top plan view illustrating the third mask process in the method of manufacturing the touch screen panel according to the second embodiment of this invention, and for a better understanding, in FIG. 14A, the second insulation pattern 220*b* formed in the routing forming area B is not depicted.

Referring to FIGS. 14A and 14B, the second conductive pattern groups including a plurality of first electrode serials 230, a plurality of second electrode serials 235, upper patterns 216*b* of the first pads, and upper patterns 218*b* of the second pads is formed on the substrate 222 on which the first connection patterns 210, the first and second routing wires 212 and 214, the lower patterns 216*a* and 218*a* of the first and second pads, and the first and second insulation patterns 220*a* and 220*b* are formed using the third mask process. The plurality of first electrode serials 230 are optionally arranged in parallel in a first direction (for example, an x-direction). And the plurality of second electrode serials 235 are optionally arranged in parallel in a second direction (for example, a y-direction) intersecting with the first direction.

In more detail, the second conductive layer is deposited on an entire surface of the substrate 200 through a deposition process such as sputtering. On the substrate 200, the first connection patterns 210, the first and second routing wires 212 and 214, the lower patterns 216*a* and 218*a* of the first and second pads, and the first and second insulation patterns 220*a* and 220*b* are formed. Thereafter, the second conductive layer is patterned with a photolithography process and an etching process using a third mask to form the second conductive pattern group including the plurality of first electrode serials 230 arranged in parallel in the first direction, the plurality of second electrode serials 235 arranged in parallel in the second direction intersecting with the first direction, the upper patterns 216*b* of the first pads, and the upper patterns 218*b* of the second pads. Here, each of the first electrode serials 230 includes the plurality of first electrode patterns 231, and each of the second electrode serials 235 includes the plurality of second electrode patterns 236 and the second connection patterns 237 for connecting neighboring second electrode patterns 236. As a material of the second conductive layer, ITO or IZO is used, and if a thickness thereof is about 1,200 Å to about 1,600 Å, a maximum transmittance can be obtained.

As a result of the third mask process, in the electrode forming part A, the first portion 231*a* of the first electrode pattern 231 is formed on the first portion 210*a* of the first connection pattern 210, the second portion 231*b* of the first electrode pattern 231 is formed on the second portion 210*b* of the first connection pattern 210, and the middle portion 231*c* of the first connection pattern 210 is formed on the substrate 200. Accordingly, the neighboring first electrode patterns 231 are electrically connected to each other by the first connection pattern 210. In FIG. 14B, the first and second portions 231 a and 231 b of the first electrode pattern 231 are formed on the first and second portions 210*a* and 210*b* of the first connection pattern 210, and the upper surface and side wall of the first insulation pattern 220*a*, respectively. However, this invention is not limited thereto, the first and second portions 231*a* and 231*b* of the first electrode pattern 231 may be formed on only the first and second portions 210*a* and 210*b* of the first connection pattern 210, otherwise on the first and second portions 210*a* and 210*b* of the first connection pattern 210 and the side wall of the first insulation pattern 220*a*, respectively.

In the routing wire forming part B, the second insulation pattern 220*b* is formed on the first routing wires 212 and the substrate 200 to expose the portion 212*a* of the first routing wire 212 and a portion (not shown) of the second routing wire 214. The second portion 231*b* of the first electrode pattern 231 at outmost of the electrode forming part A is also formed on the portion 212a of the first routing wire 212 and the side wall and upper surface of the second insulation pattern 220b. However, this invention is not limited thereto, the second portion 231b of the first electrode pattern 231 at outmost of the electrode forming part A may be formed on only the portion 212a of the first routing wire 212, otherwise on the portion 212a of the first routing wire 212 and the side wall of the second insulation pattern 220b, respectively.

In the pad forming part C, the upper pattern 216b and 218b of the first and second pads are formed on the lower patterns 216a and 218a so that the upper patterns 216b and 218b surround the lower patterns 216a and 218a, respectively. In FIG. 14B, any insulation pattern is not formed on first and second pads 216 and 218 so that they are electrically connected to external circuits. However, it is possible to form insulation patterns on the first and second pads 216 and 218 if the insulation pattern has contact holes to expose portions of the first and second pads 216 and 218.

Figure 15:
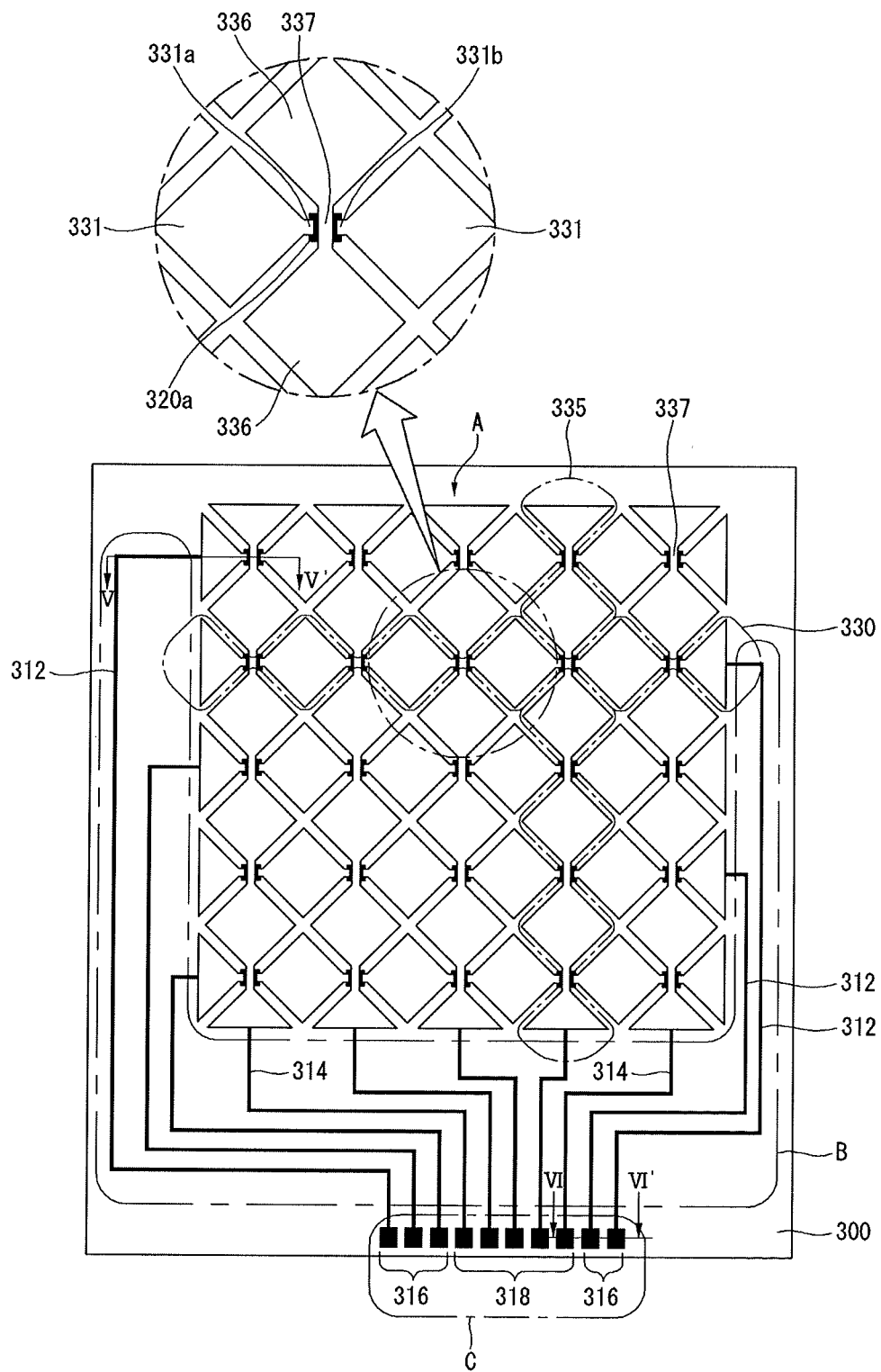
FIG. 15 is a top plan view illustrating an electrostatic capacitive touch screen panel according to a third embodiment of this invention.

An electrostatic capacitive touch screen panel according to a third embodiment of this invention will be described with reference to FIGS. 15 and 16. FIG. 15 is a top plan view illustrating the touch screen panel according to the third embodiment of this invention, and FIG. 16 is a cross-sectional view illustrating the touch screen panel taken along line V-V' and line VI-VI' of FIG. 15.

Figure 16:
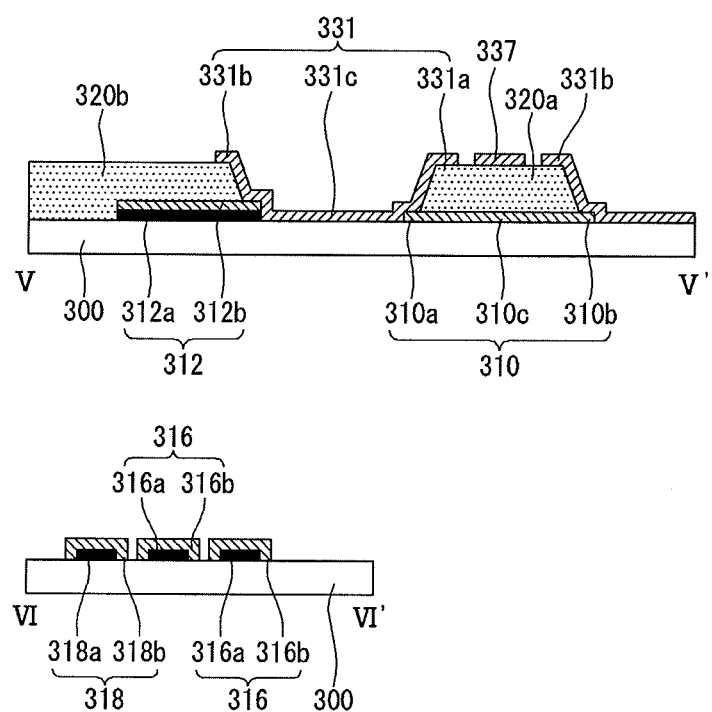
FIG. 16 is a cross-sectional view illustrating the touch screen panel taken along line V-V' and line VI-VI' of FIG. 15.

Referring to FIGS. 15 and 16, the touch screen panel according to the third embodiment of this invention includes an electrode forming part A, a routing wire forming part B, and a pad forming part C.

The electrode forming part A includes a plurality of first electrode serials 330 optionally arranged in parallel in a first direction (for example, an X-axis direction) and a plurality of second electrode serial 335 optionally arranged in parallel in a second direction (for example, an Y-axis direction) to intersect with the first direction. Each of the first electrode serials 330 includes first electrode patterns 331 having a triangle shape, a quadrangle shape, a diamond shape, a polygon shape, and so on, and first connection patterns 310 for connecting neighboring first electrode patterns 331. Each of the second electrode serials 335 includes second electrode patterns 336 having a triangle shape, a quadrangle shape, a diamond shape, a polygon shape, and so on, similar to the first electrode patterns 331 and second connection patterns 337 for connecting neighboring second electrode patterns 336.

In the third embodiment of this invention, the first connection patterns 310 are formed separately from the first electrode patterns 331, and the second connection patterns 337 are integrally formed with the second electrode patterns 336. Alternatively, the first connection patterns may be integrally formed with the first electrode patterns, and the second connection patterns may be formed separately from the second electrode patterns.

The routing wire forming part B is formed on the substrate 300 at positions outside the electrode forming part A, and includes a plurality of first routing wires 312 connected to the plurality of first electrode serials 330, respectively and a plurality of second routing wires 314 connected to the plurality of second electrode serials 335, respectively.

The pad forming part C includes a plurality of first pads 316 connected to the plurality of first electrode serials 330 through the plurality of first routing wires 312, respectively, and a plurality of second pads 318 connected to the plurality of second electrode serials 335 through the plurality of second routing wires 314, respectively.

The touch screen panel according to the third embodiment of this invention is different from those according to the first and second embodiments of this invention in that material used as the first connection patterns 310 is different from material used as the first and second routing wires 312 and 314. In the third embodiment of this invention, the first and second routing wires 312 and 314 are formed of a single layer or multiple layers. For example, if the first and second routing wires 312 and 314 are formed of multiple layers, lower layers 312a and 314a may include one of Al, AlNd, Mo, MoTi, Cu, CuOx and Cr, and upper layers 312b and 314b may include one of ITO and IZO. The first connection patterns 310 may include a transparent conductive material such as ITO or IZO. Further, it is preferable, though not necessary, that the first connection patterns 310 are formed to have a thickness of about 2,000 Å to about 3,000 Å and a width of about 3 μm to about 10 μm. If a thickness of the first connection patterns 310 is less than 2,000 Å, the resistance of the first connection patterns 310 is high, and if a thickness of the first connection patterns 310 is larger than 3,000 Å, a step difference of a pattern increases. Also, if a width of the first connection patterns 310 is less than 3 μm, the resistance of the first connection patterns 310 is high, and if a width of the first connection patterns 310 is larger than 10 μm, the connection patterns 310 is visible.

In the third embodiment of this invention, it needs four mask processes to manufacture the touch screen panel because material of the first connection patterns 310 is different from that of the first and second routing wires 312 and 314.

In the touch screen panel according to the third embodiment of this invention, first insulation patterns 320a are formed in the electrode forming part A to expose a first and second portions 310a and 310b of the first connection patterns 310 and to insulate the first connection patterns 310 from the second connection patterns 337. Each of the first electrode patterns 331 includes a first portion 331a formed on a first portion 310a of the first connection pattern 310, a second portion 331b formed on a second portion 310b of the first connection pattern 310 and a middle portion 331c formed on the substrate 300. Accordingly, neighboring first electrode patterns 331 are electrically connected to each other by the connection patterns 310. In the FIG. 16, the first and second portions 331a and 331b of the first electrode pattern 331 are formed on the first and second portions 310a and 310b of the first connection pattern 310 and side wall and upper surface of the first insulation pattern 320a, but this invention is not limited thereto. For example, the first and second portions 331a and 331b of the first electrode pattern 331 may be formed on only the first and second portions 310a and 310b of the first connection pattern 310, respectively, otherwise on the first and second portions 310a and 310b of the first connection pattern 310 and the side wall of the insulation pattern 320a. However, if the first and second portions 331a and 331b of the first electrode pattern 331 are formed on the first and second portions 310a and 310b of the first connection pattern 310 and side wall and upper surface of the first insulation pattern 320a as shown in FIG. 16, a process margin which corresponds to a length from the side wall and the upper surface of the first insulation pattern 320a can be secured. Accordingly, although misalignment exists at a process of patterning the first and second electrode patterns 331 and 3236, it is possible to assure electrical contact between the first electrode patterns 231 and the first connection pattern 210.

In the touch screen panel according to the third embodiment of this invention, first insulation patterns 320a are formed in the routing wire forming part B to expose a portion 312a of the first routing wire 312 and a portion (not shown) of the second routing wire 314. The second portion 331b of the first electrode pattern 331 at outmost of the electrode forming part A is formed on a portion 212a of the first routing wire 212 and side wall and upper surface of the second insulation pattern 320b. A portion of the second electrode pattern 336 at outmost of the electrode forming part A is also formed on a portion (not shown) of the second routing wire 314 and side wall and upper surface of the second insulation pattern 320b. However, this invention is not limited thereto, the portion of the second electrode pattern 336 at outmost of the electrode forming part A may be formed on only the portion of the second routing wire 314, otherwise on the portion of the second routing wire 314 and the side wall of the second insulation pattern 320b, respectively.

Also, as shown in FIG. 16, any insulation pattern is not formed on first and second pads 316 and 318 in the pad forming part C so that they are electrically connected to external circuits. However, it is possible to form insulation patterns on the first and second pads 316 and 318 if the insulation pattern has contact holes to expose portions of the first and second pads 316 and 318.

The first and second insulation patterns 320a and 320b includes silicon nitride (SiNx). If a thickness of the first insulation pattern 320a is less than 5,000 Å, the first insulation pattern 320a may be destroyed or damaged by a voltage applied to the first electrode serial 330 and the second electrode serial 335. Therefore, in order to prevent or reduce a phenomenon in which a failure occurs due to destruction or damage of the first insulation pattern 320a while using the touch screen panel, it is preferable, though not required, to form the first insulation pattern 320a so that a thickness of the insulation pattern 320a is about 5,000 Å or more. Further, if a thickness of the first insulation pattern 320a is about 6,000 Å, a saturation state in which a transmittance no longer increases is observed and a color transition phenomenon becomes a minimum. That is, in view of a transmittance and chromaticity expression, when a thickness of the first insulation pattern 320a is 6,000 Å or more, a transmittance becomes a maximum and a color transition phenomenon becomes a minimum and thus it is most preferable that the first insulation pattern 320a has a thickness of 6,000 Å or more. However, if a thickness of the first insulation pattern 320a exceeds 7,000 Å, it is difficult to remove a portion of insulation layer 320 in the electrode forming part A, and much more process time is required due to a characteristic of a silicon nitride used as a material of the insulation layer 320. Therefore, when considering stability of the insulation layer 320, a good light transmittance, and chromaticity expression ability together, it is most preferable, though not required, to form a thickness of the first insulation pattern 320a in a range of 5,000 Å to 7,000°, but it is possible to form a thickness of the insulation layer 120 in a range of 5,000 Å to 10,000 Å.

The first and second electrode patterns 331 and 336 and the second connection patterns 337 are made of a transparent conductive material such as ITO or IZO. In the third embodiment of this invention, because the first and second electrode serials 330 and 335 and the second connection patterns 337 formed on a top layer of the touch screen panel are made of ITO or IZO, and ITO or IZO has very high hardness, a scratch does not occur in a subsequent process of forming a display device on the other surface of the substrate 300 of the touch screen panel, and thus a touch screen panel of a good quality is obtained.

Hereinafter, a method of manufacturing the touch screen panel according to the third embodiment of this invention will be described with reference to FIGS. 17A to 20B.

Figure 17A:
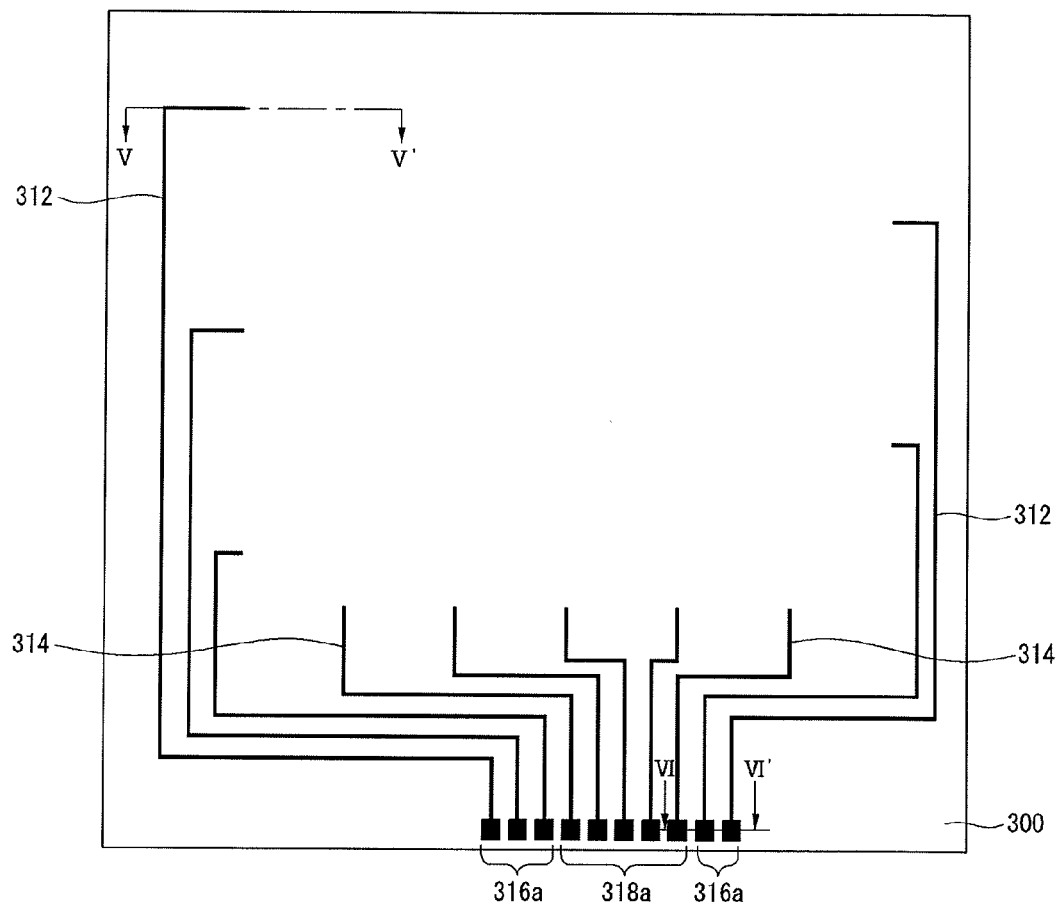
FIGS. 17A and 17B are a top plan view and a cross-sectional view illustrating a first mask process of processes of manufacturing the touch screen panel shown in FIG. 15.
Figure 17B:
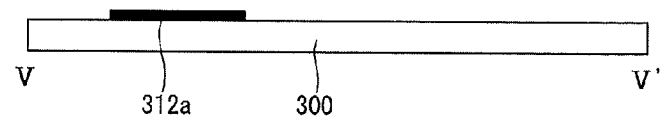
Figure 17B:
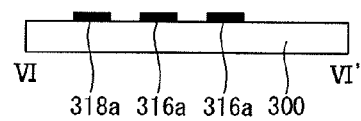
Figure 18A:
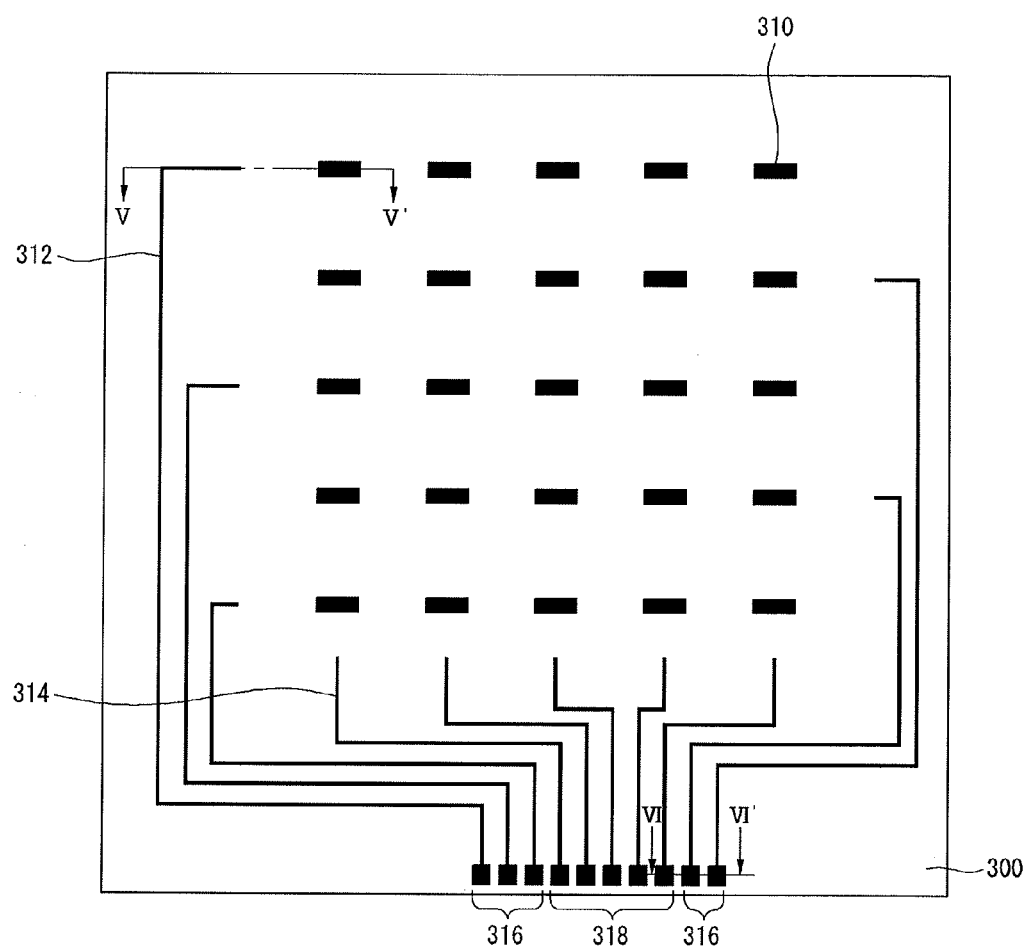
FIGS. 18A and 18B are a top plan view and a cross-sectional view illustrating a second mask process of processes of manufacturing the touch screen panel shown in FIG. 15.
Figure 18B:
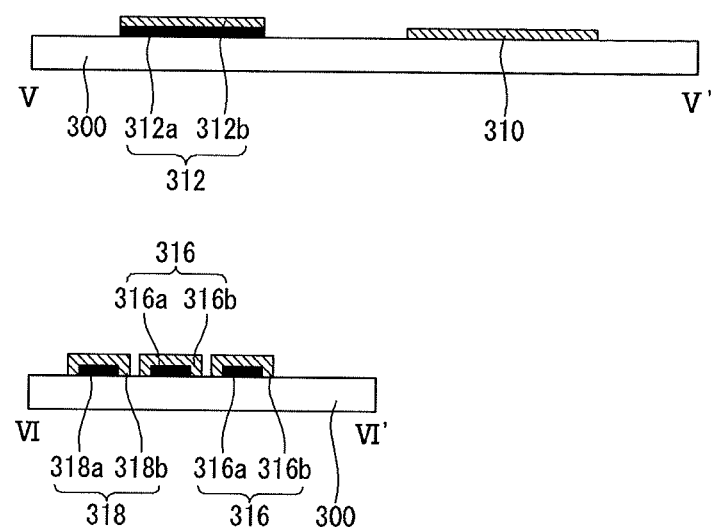

FIGS. 17A and 17B are a top plan view and a cross-sectional view illustrating a first mask process in the method of manufacturing the touch screen panel according to the third embodiment of this invention.

Referring to FIGS. 15, 17A, and 17B, a first conductive pattern group including lower patterns 312a of first routing wires 312, lower patterns 314a of second routing wires 314, lower patterns 316a of first pads and lower patterns 318a of second pads is formed on the substrate 300 which includes an electrode forming part A, a routing wire forming part B and a pad forming part C using the first mask process.

In more detail, a first conductive layer is deposited on the substrate 300 through a deposition process such as a sputtering method. As the first conductive layer is patterned with a photolithography process and an etching process using a first mask, the first conductive pattern group including the lower patterns 312a of the first routing wires 312, the lower, patterns 314a of the second routing wires 314, the lower patterns 316a of the first pads and the lower patterns 318a of the second pads is formed. Here, as a material forming the first conductive pattern group, Al, AlNd, Mo, MoTi, Cu, CuOx, Cr and so on are used.

In another embodiment, the first conductive pattern group including the lower patterns 312a of the first routing wires 312, the lower patterns 314a of the second routing wires 314, the lower patterns 316a of the first pads and the lower patterns 318a of the second pads may be formed by being printed on the substrate 300. Subsequent drying and/or heating process may be performed. In such a case, the photolithography process and the etching process using the first mask may be skipped. In other embodiments, other pattern forming processes may be used.

Thereafter, through a deposition process such as a sputtering method, a second conductive layer is formed on the substrate 300 on which the first conductive pattern group is formed. As the second conductive layer is patterned with a photolithography process and an etching process using a second mask, a plurality of first connection patterns 310 are formed in the electrode forming part A. Also, in the routing wire forming part B, the upper patterns 312b of the first routing wires 312 are formed on the lower patters 312a of the first routing wires 312, and the upper patterns (not shown) of the second routing wires 314 are formed on the lower patters 314a of the second routing wires 314. Also in the pad forming part C, the upper patterns 316b of the first pads 316 are formed on the lower patterns 316a of the first pads 316, and the upper patterns 318b of the second pad 318 are formed on the lower patterns 318a of the second pad 318. The first connection pattern 310 formed in the electrode forming part A (see FIG. 15) is formed to have a thickness of about 2,000 Å to about 3,000 Å and a width of about 3 µm to about 10 µm.

FIGS. 19A to 19D are a top plan view and cross-sectional views illustrating a third mask process in a method of manufacturing the touch screen panel according to the third embodiment of this invention. The first and second routing wires 312 and 314 are indicated by dotted lines in FIG. 19A. The first and second routing wires 312 and 314 are portions that are not displayed in a top plan view because they are covered by the second insulation pattern 320b, however for a better understanding, in this invention, the first and second routing wires 312 and 314 are indicated by dotted lines.

Figure 19A:
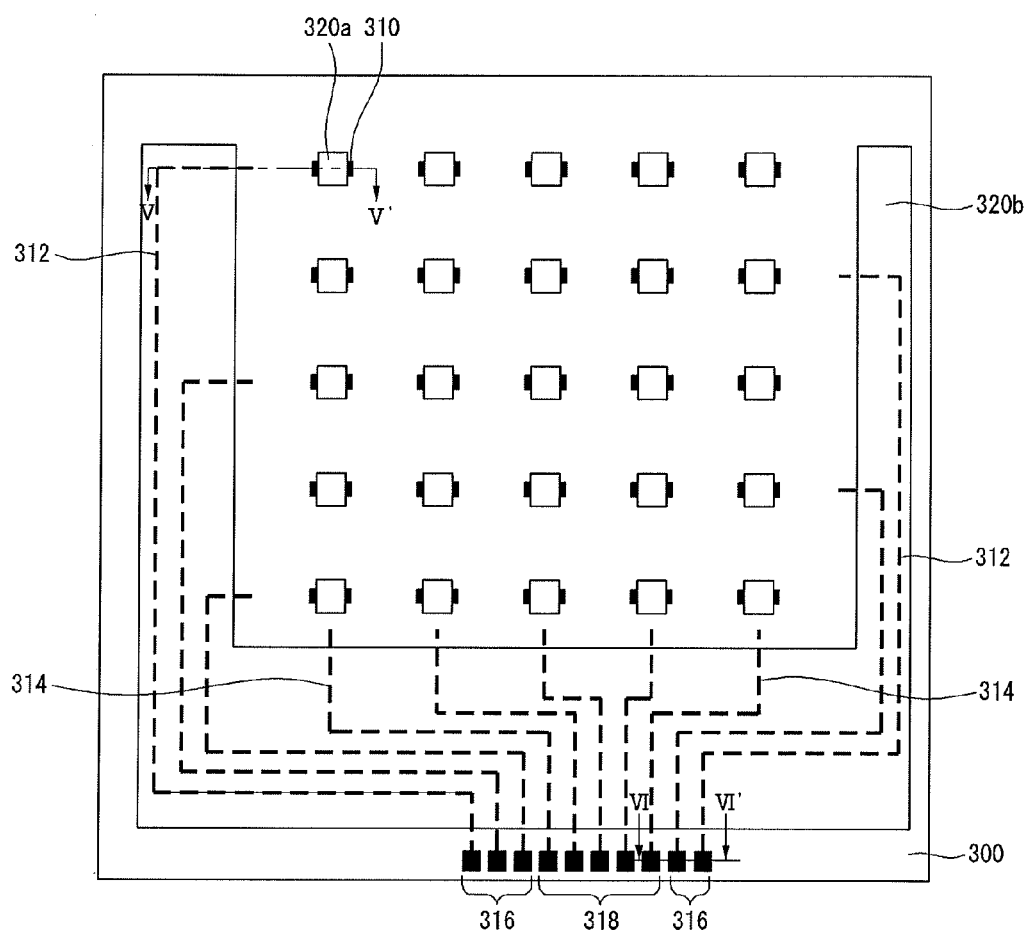
FIGS. 19A to 19D are a top plan view and cross-sectional views illustrating a third mask process of processes of manufacturing the touch screen panel shown in FIG. 15.
Figure 19B:
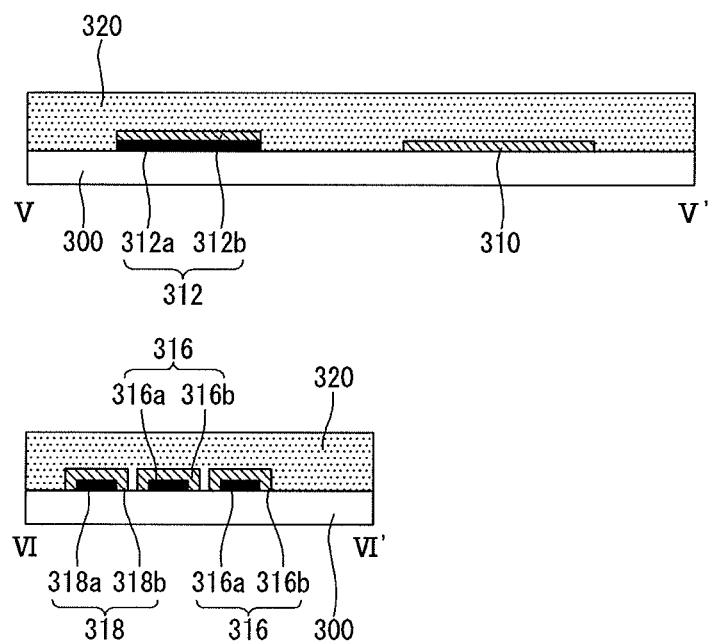

Referring to FIGS. 19A and 19B, an insulation layer 320 is formed through a deposition method such as sputtering on an entire surface of the substrate 300 on which the conductive pattern group including the first connection patterns 310, the first routing wires 312, the second routing wires 314, the first pads 316 and the second pads 318 is formed. As a material of the insulation layer 320, an inorganic insulation material such as silicon nitride (SiNx) is used. A thickness of the insulation layer 320 is preferably set to a range of about 5,000 Å to about 10,000 Å, more preferably, though not required, to a range of about 5,000 Å to about 7,000 Å.

Figure 19C:
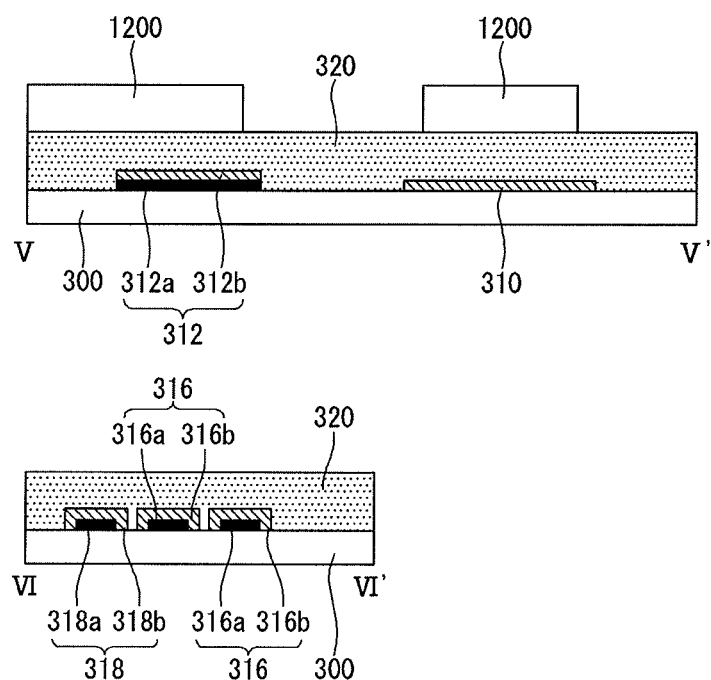
Figure 19D:
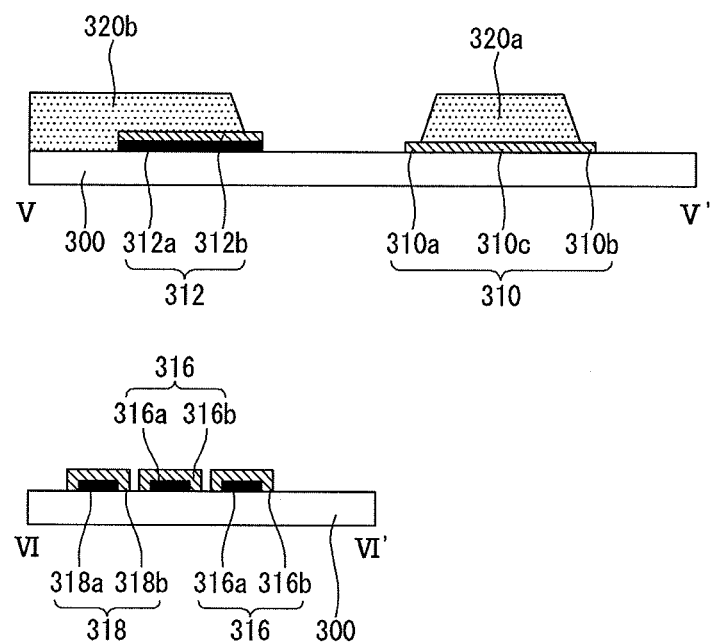

After the insulation layer 320 is formed, as shown in FIG. 19C, a photoresist pattern 1200 is formed on a portion in which the insulation layer 320 should exist by a photolithography process using a second mask. First and second insulation patterns 320a and 320b are formed in the electrode forming part A with a dry etching process using the photoresist pattern 1200 as shown in FIG. 19D. The first insulation patterns 320a are formed on the first connection patterns 310 and the substrate 300 in the electrode forming part A to expose a first portion 310a and a second portion 310b of the first connection patterns 310. The second insulation pattern 320b is formed on the first and second routing wires 312 and 314 and the substrate 300 in the routing wire forming part B to expose a portion of the first routing wire 312 and a portion (not shown) of the second routing wire 314. The first and second pads 316 and 318 are formed in the pad forming part C to expose the upper patterns 316b and 318b of the first and second pads 316 and 318.

Figure 20A:
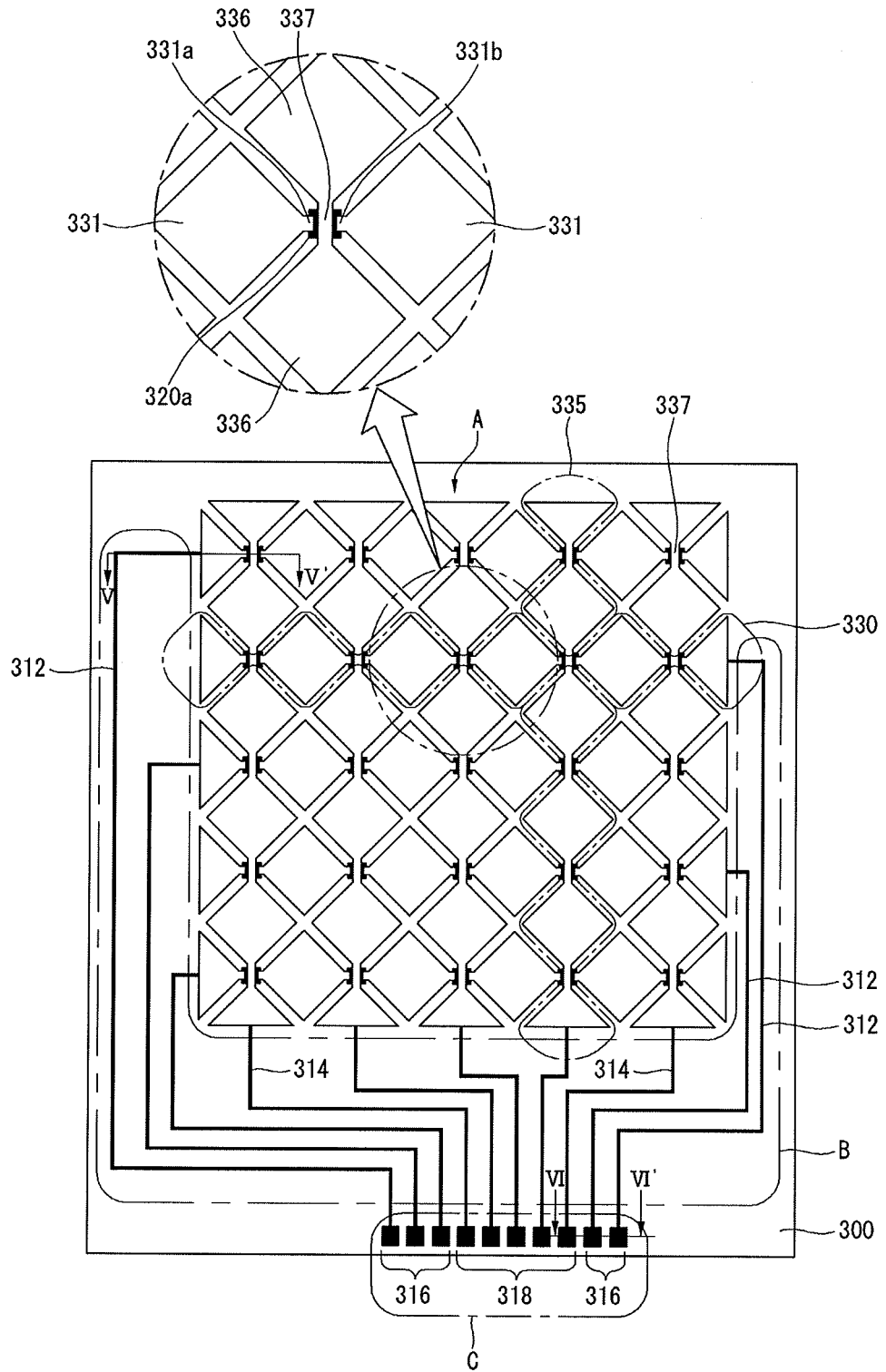
FIGS. 20A and 20B are a top plan view and a cross-sectional view illustrating a fourth mask process of processes of manufacturing the touch screen panel shown in FIG. 15.
Figure 20B:
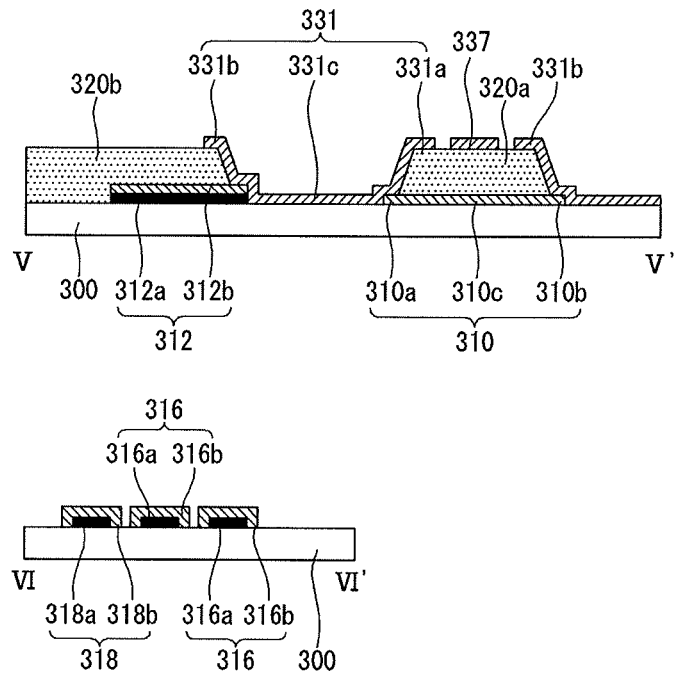

FIGS. 20A and 20B are a top plan view and a cross-sectional view illustrating a fourth mask process in the method of manufacturing the touch screen panel according to the third embodiment of this invention. FIG. 20A is a top plan view illustrating the fourth mask process in the method of manufacturing the touch screen panel according to the third embodiment of this invention, and for a better understanding, in FIG. 20A, the second insulation pattern 320b formed in the routing forming area B is not depicted.

Referring to FIGS. 20A and 20B, a second conductive pattern group including a plurality of first electrode serials 330 and a plurality of second electrode serials 335 is formed on the substrate 300 on which the first connection patterns 310, the first and second routing wires 312 and 314, the first and second pads 316 and 318, and the first and second insulation patterns 320a and 320b are formed using the fourth mask process. The plurality of first electrode serials 330 are optionally arranged in parallel in a first direction. And the plurality of second electrode serials 335 are optionally arranged in parallel in a second direction intersecting with the first direction.

In more detail, a third conductive layer is deposited on an entire surface of the substrate 300 through a deposition process such as sputtering. On the substrate 300, the first connection patterns 310, the first and second routing wires 312 and 314, the first and second pads 316 and 318, and the first and second insulation patterns 320a and 320b are formed. Thereafter, the third conductive layer is patterned with a photolithography process and an etching process using a fourth mask to form the second conductive pattern group including the plurality of first electrode serials 330 arranged in parallel in the first direction and the plurality of second electrode serials 335 arranged in parallel in the second direction intersecting with the first direction. Here, each of the first electrode serials 330 includes the plurality of first electrode patterns 331, and each of the second electrode serials 335 includes the plurality of second electrode patterns 336 and the second connection patterns 337 for connecting neighboring second electrode patterns 336. As a material of the third conductive layer, ITO or IZO is used, and if a thickness thereof is about 1,200 Å to about 1,600 Å, a maximum transmittance can be obtained.

As a result of the fourth mask process, in the electrode forming part A, the first portion 331a of the first electrode pattern 331 is formed on the first portion 310a of the first connection pattern 310, the second portion 331b of the first electrode pattern 331 is formed on the second portion 310b of the first connection pattern 310, and the middle portion 331c of the first connection pattern 310 is formed on the substrate 300. Accordingly, the neighboring first electrode patterns 331 are electrically connected to each other by the first connection pattern 310. In FIG. 20B, the first and second portions 331a and 331b of the first electrode pattern 331 are formed on the first and second portions 310a and 310b of the first connection pattern 310, and the upper surface and side wall of the first insulation pattern 320a, respectively. However, this invention is not limited thereto, the first and second portions 331a and 331b of the first electrode pattern 331 may be formed on only the first and second portions 310a and 310b of the first connection pattern 310, otherwise on the first and second portions 310a and 310b of the first connection pattern 310 and the side wall of the first insulation pattern 320a, respectively.

In the routing wire forming part B, the second insulation pattern 320b is formed on the first and second routing wires 312 and 314 and the substrate 300 to expose portions of the first and second routing wire 312 and 314. The second portion 331b of the first electrode pattern 331 at outmost of the electrode forming part A is also formed on the portion of the first routing wire 312 and the side wall and upper surface of the second insulation pattern 320b. However, this invention is not limited thereto, the second portion 331b of the first electrode pattern 331 at outmost of the electrode forming part A may be formed on only the portion 312a of the first routing wire 312, otherwise on the portion 312a of the first routing wire 312 and the side wall of the second insulation pattern 320b, respectively.

In the pad forming part C, the upper pattern 316b and 318b of the first and second pads 316 and 318 are formed on the lower patterns 316a and 318a so that the upper patterns 316b and 318b surround the lower patterns 316a and 318a, respectively. In FIG. 20B, any insulation pattern is not formed on first and second pads 316 and 318 so that they are electrically connected to external circuits. However, it is possible to form insulation patterns on the first and second pads 316 and 318 if the insulation pattern has contact holes to expose portions of the first and second pads 316 and 318.

In the touch screen panel according to the third embodiment of this invention, the material used as the lower patterns 312a and 314a of the first and second routing wires 312 and 314 includes Al, AlNd, Mo, MoTi, Cu CuOx, or Cr, the material used as the upper patterns 312b and 314b of the first and second routing wires 312 and 314 includes a transparent conductive material such as ITO or IZO, and the material used as the first connecting patterns 310 includes the transparent conductive material such as ITO or IZO. However, this invention is not limited thereto.

Figure 20C:
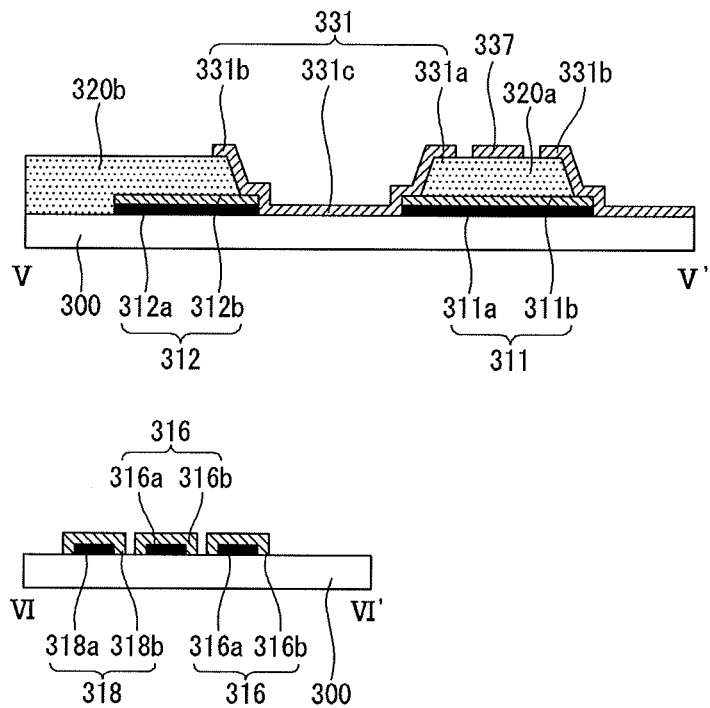
FIG. 20C is a cross-sectional view illustrating another example of the touch screen panel shown in FIG. 15.

For example, as shown in FIG. 20C, the material used as the lower patterns 312a and 314a of the first and second routing wires 312 and 314 may include Al, AlNd, Mo, MoTi, Cu, CuOx or Cr, the material used as the upper patterns 312b and 314b of the first and second routing wires 312 and 314 includes a transparent conductive material such as ITO or IZO, the material used as the lower patterns 311a of the first connecting patterns 311 may includes include Al, AlNd, Mo, MoTi, Cu, CuOx or Cr, and the material used as the upper patterns 311b of the first connecting patterns 311 may include the transparent conductive material such as ITO or IZO. In this case, it is possible to reduce one mask process compared to the third embodiment because the first and second mask processes of the third embodiment can be performed by one mask process.

Figure 21:
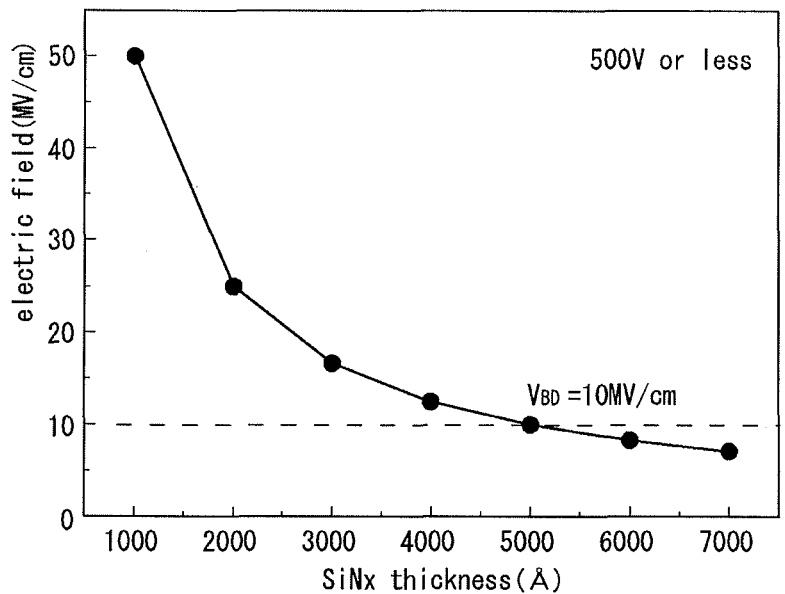
FIG. 21 is a graph illustrating an electric field value of a breakdown point in which an insulation layer is destroyed or damaged according to a thickness of silicon nitride used as an insulation layer when a thickness of ITO used as first and second electrode patterns is 1,400 Å.
Figure 22:
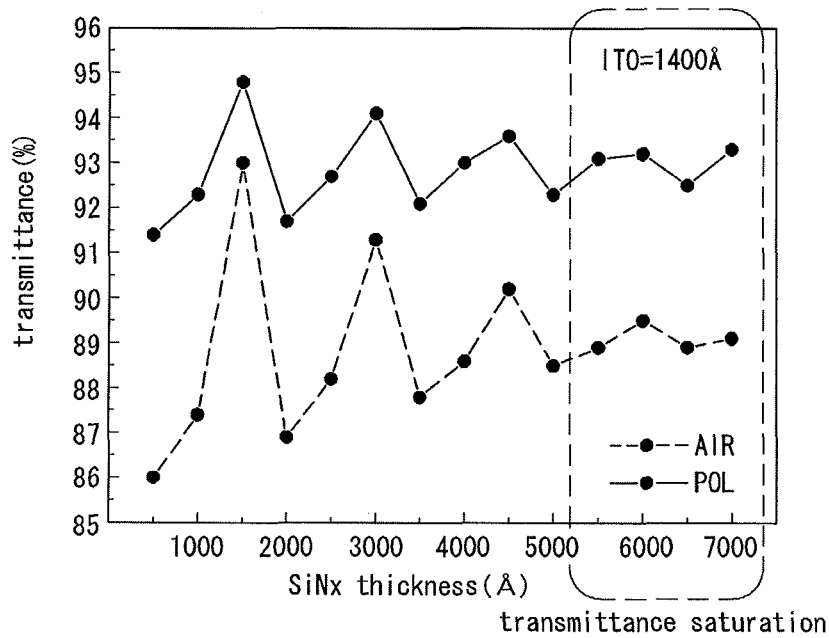
FIG. 22 is a graph illustrating a transmittance of a touch screen panel according to a thickness of silicon nitride used as an insulation layer when a thickness of ITO using as first and second electrode patterns is 1,400 Å.
Figure 23:
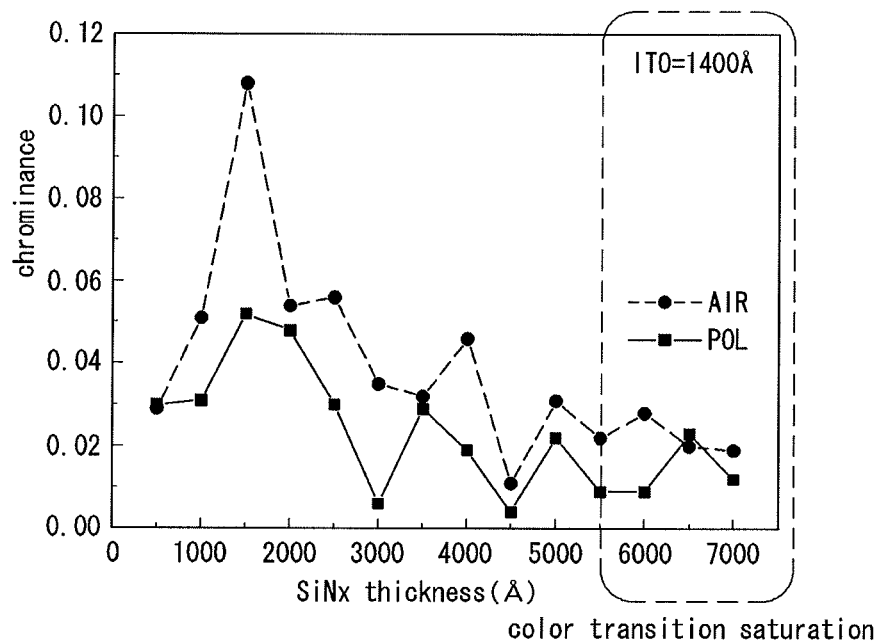
FIG. 23 is a graph illustrating a color transition characteristic of a touch screen panel according to a thickness of silicon nitride used as an insulation layer when that a thickness of ITO used as first and second electrode patterns is 1,400 Å.

FIGS. 21 to 23 are simulation graphs illustrating a breakdown voltage, a transmittance, and a color transition characteristic according to a thickness of silicon nitride in the touch screen panel formed by using ITO as the first and second electrode patterns and using silicon nitride as the insulation layer (or pattern).

FIG. 21 is a graph illustrating an electric field value of a breakdown point in which an insulation layer is destroyed or damaged according to a thickness of silicon nitride used as the insulation layer when a thickness of ITO used as first and second electrode patterns is about 1,400 Å. In FIG. 21, a horizontal axis represents a thickness (A) of silicon nitride and a vertical axis represents intensity (MV/cm) of an electric field. As shown in FIG. 21, it is very important to appropriately adjust a thickness of silicon nitride because silicon nitride is destroyed or damaged when an electric field of 10 megavolt/cm or more is applied. In a condition in which a voltage (this value is a reliability condition of a touch screen panel manufacturer) of 500 volts or less is applied between the first and second electrode patterns 131 and 136 of the touch screen panel, when a thickness of silicon nitride is about 5,000 Å or less, insulation of silicon nitride was destroyed or damaged. Therefore, silicon nitride as the insulation layer should be formed in a thickness of 5,000 Å or more.

FIG. 22 is a graph illustrating a transmittance of a touch screen panel according to a thickness of silicon nitride used as the insulation layer when a thickness of ITO using as the first and second electrode patterns is about 1,400 Å. In FIG. 22, a horizontal axis represents a thickness (A) of silicon nitride and a vertical axis represents a transmittance (%), "AIR" represents a transmittance of an instance in which a polarization sheet is not attached to the touch screen panel, and "POL" represents a transmittance of instance in which a polarization sheet is attached to the touch screen panel. As can be seen from FIG. 22, in a thickness of 5,000 Å or more in which the insulation layer is not destroyed or damaged, a transmittance gradually increases in a thickness of about 5,000 Å, arrives at a peak value in a thickness of about 6,000 Å, falls again to a thickness of about 6,500 Å, and increases again to a thickness of about 7,000 Å. That is, in an insulation layer thickness of 6,000 Å or more, because a transmittance is saturated, even if a thickness deviation occurs, there is no or little change of transmittance. FIG. 22 shows that a single touch screen panel has a transmittance of about 89%, and when a polarization sheet is attached to the touch screen panel, a transmittance of about 93% was obtained.

FIG. 23 is a graph illustrating a color transition characteristic of the touch screen panel according to a thickness of silicon nitride used as an insulation layer when a thickness of ITO used as first and second electrode patterns is 1,400 Å. In FIG. 23, a horizontal axis represents a thickness (A) of silicon nitride and a vertical axis represents a chrominance, "AIR" represents a chrominance of an instance in which a polarization sheet is not attached to the touch screen panel, and "POL" represents a chrominance of an instance in which a polarization sheet is attached to the touch screen panel. As can be seen from FIG. 24, similarly to an instance of a transmittance, in a thickness of 5,000 Å or more in which the insulation layer is not destroyed or damaged, a color transition characteristic is similar to a transmittance characteristic.

Figure 24:
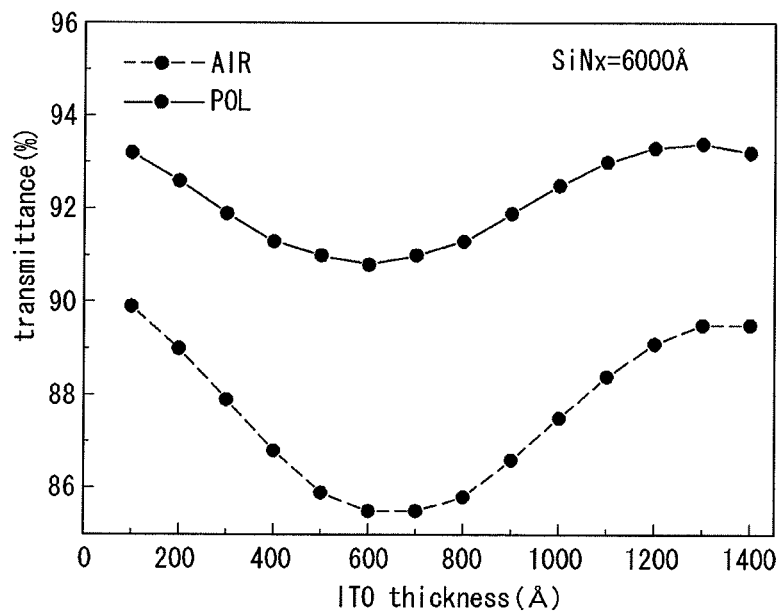
FIG. 24 is a graph illustrating a characteristic of a transmittance according to a thickness of ITO used as first and second electrode patterns when a thickness of silicon nitride formed as an insulation layer is 6,000 Å.
Figure 25:
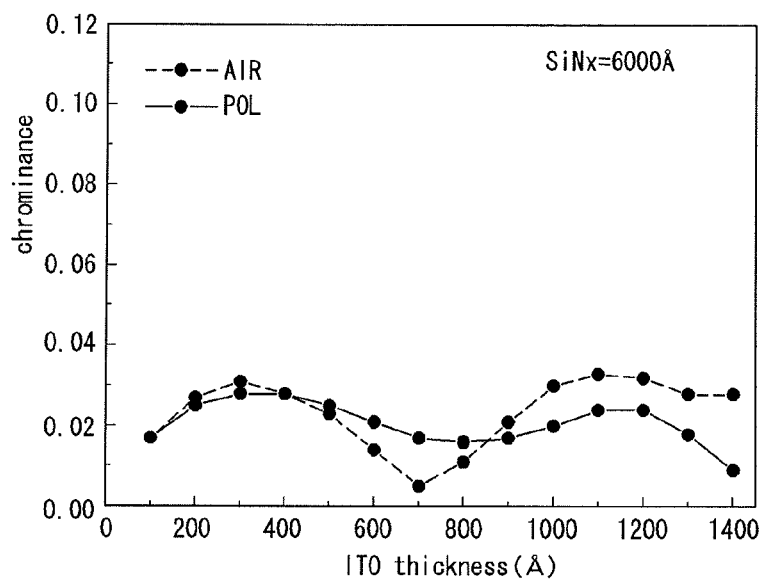
FIG. 25 is a graph illustrating a color transition characteristic according to a thickness of ITO used as first and second electrode patterns when a thickness of silicon nitride formed as an insulation layer is 6,000 Å.

FIGS. 24 and 25 are simulation graphs of a transmittance characteristic and a color transition characteristic according to a thickness of an ITO layer in the touch screen panel formed by using ITO as the first and second electrode patterns and using silicon nitride as an insulation layer.

FIG. 24 is a graph illustrating a characteristic of transmittance according to a thickness of ITO used as the first and second electrode patterns when a thickness of silicon nitride formed as an insulation layer is 6,000 Å. In FIG. 24, a horizontal axis represents a thickness (Å) of an ITO layer, a vertical axis represents a transmittance (%), "AIR" represents a transmittance of an instance in which a polarization sheet is not attached to the touch screen panel, and "POL" represents a transmittance of an instance in which a polarization sheet is attached to the touch screen panel. As can be seen from FIG. 24, a thickness of silicon nitride is fixed to 6,000 Å and a light transmittance according to an ITO thickness has a minimum value in 700 Å and has a maximum value in 1400 Å.

FIG. 25 is a graph illustrating a color transition characteristic according to a thickness of ITO used as first and second electrode patterns when a thickness of silicon nitride formed as an insulation layer is 6,000 Å. In FIG. 25, a horizontal axis represents a thickness (A) of an ITO layer and a vertical axis represents a chrominance, "AIR" represents a color transition degree of an example in which a polarization sheet is not attached to the touch screen panel, and "POL" represents a color transition degree of an instance in which a polarization sheet is formed in the touch screen panel. As can be seen from FIG. 25, when a thickness of silicon nitride is fixed to 6,000 Å and a color transition degree according to an ITO thickness is measured, the color transition degree has a minimum value in about 700 Å, and thus an optimum ITO thickness is obtained in about 100 Å or about 1400 Å. However, in a display of a notebook computer size or more, due to a resistance problem, an optimum ITO thickness is obtained in about 1400 Å. In a consideration of a thickness range of silicon nitride used in the example embodiment, when a thickness of ITO is about 1,200 ÅA to about 1,600 Å, a maximum transmittance is obtained.

Further, in the example embodiment, because the first and second electrode serials and the second connection patterns are formed on a top layer of the touch screen panel, a scratch does not occur in a subsequent process.

Figure 26:
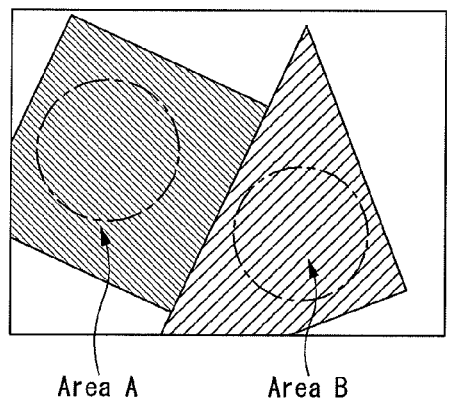
FIG. 26 is a drawing illustrating a result before and after performing a scratch test of an area A in which the top of a touch screen panel is an insulation layer and an area B in which the top of a touch screen panel is ITO.
Figure 26:
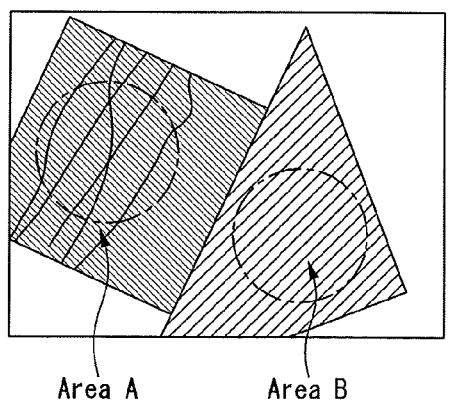

FIG. 26 is a drawing illustrating a result before and after performing a scratch test of an area A in which the top of a touch screen panel is an insulation layer and an area B in which the top of a touch screen panel is ITO. In the result after performing a scratch test, a scratch occurs in the area A of the insulation layer, but a scratch does not occur in the area B of ITO.

Further, as a thickness of the first connection pattern formed between the insulation layer and the substrate to connect the first electrode patterns is formed in about 2,000 Å to about 3,000 Å, good process ability and an appropriate resistance value can be obtained, and as a width is set to a range of about 3 μm to about 10 μm, a pattern is not visible.

The touch screen panels according to the embodiments of this invention may be applied to display devices such as a liquid crystal display, a field emission display, a plasma display panel, an electroluminescence device, an electrophoresis display and a flexible display. In these cases, the substrates of the touch screen panels may be also used as substrates of the display devices.

Although example embodiments have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel, comprising:
   a substrate including an electrode forming part, and a routing wire forming part, the routing wire forming part located at an area outside the electrode forming part;
   a plurality of first electrode connection patterns in the electrode forming part;
   a plurality of first routing wires and a plurality of second routing wires, both in the routing wire forming part, the first and second routing wires disposed on the same layer with the first electrode connection patterns;
   an insulation layer formed on the substrate and covering the first electrode connection patterns and the routing wire forming part, the insulation layer having first and second contact holes that expose contact portions of the plurality of first electrode connection patterns, third contact holes that expose connecting ends of the plurality of the first routing wires, and fourth contact holes that expose connecting ends of the second routing wires;
   a plurality of first serial electrodes arranged in parallel in a first direction and connected with the plurality of first routing wires through the third contact holes, respectively;
   each first serial electrode comprising a plurality of first electrode elements;
   a plurality of second serial electrodes arranged in parallel in a second direction, and configured to intersect the first serial electrodes;
   the second serial electrodes connected with the plurality of second routing wires through the fourth contact holes, respectively;
   each second serial electrode comprising a plurality of second electrode elements; and
   wherein each of the plurality of first electrode connection patterns connects adjacent electrode elements of each first serial electrode through respective contact portions accessible through the first and second contact holes,
   the insulation layer includes silicon nitride, and has a thickness of 5,000 Å to 10,000 Å.

2. The touch screen panel of claim 1, wherein the plurality of first connection patterns and the pluralities of first and second routing wires are formed of one of Al, AlNd, Cu, CuOx, Ag, Mo, MoTi and Cr.

3. The touch screen panel of claim 1, wherein the plurality of first electrode serials and the plurality of second electrode serials include a transparent conductive material.

4. The touch screen panel of claim 1, wherein each of the plurality of first connection patterns has a thickness of about 2,000 Å to about 3,000 Å, and a width of about 3 μm to about 10 μm.

5. The touch screen panel of claim 1, wherein each of the pluralities of first and second electrode elements have a thicknesses of about 1200 Å to about 1600 Å.

6. The touch screen panel of claim 1, wherein a hollow is formed by a portion of the plurality of first electrode elements being partially filled in the plurality of contact holes.

7. A method of forming a touch screen panel, comprising the steps of:
   forming a first conductive patterns including a plurality of first routing wires and a plurality of second routing wires on the same layer with a plurality of first electrode connection patterns;
   forming an insulation layer on a substrate and on the first electrode connection patterns and the first and second routing wires;
   forming first and second contact holes in the insulation layer to expose contact portions of the first electrode connection patterns, and forming third and fourth contact holes in the insulation layer to expose connecting ends of the first routing wires and connecting ends of the second routing wires;
   forming a second conductive patterns including a plurality of first and second serial electrodes, and electrically coupling respective first serial electrodes with corresponding first routing wires through the third contact holes and electrically coupling respective second serial electrodes with corresponding second routing wires through the fourth contact holes, wherein the second serial electrodes intersect the first serial electrodes without electrical coupling; and
   wherein each first serial electrode comprises a plurality of first electrode elements electrically connected to each other through respective contact portions through the first and second contact holes,
   the insulation layer includes silicon nitride, and has a thickness of 5,000 Å to 10,000 Å.

8. The method of claim 7, wherein the forming first conductive patterns includes depositing a first conductive layer on the substrate by a deposition process and forming the plurality of first connection patterns, the plurality of first routing wires, and the plurality of second routing wires by patterning the first conductive layer with a photolithography process and an etching process using a first mask;
   the forming the insulation layer includes forming the insulation layer through a deposition process and forming the plurality of contact holes to expose the contact portions of the first connection patterns with a photolithography process and an etching process using a second mask; and
   the forming the second conductive patterns includes depositing a second conductive layer through a deposition process on the insulation layer in which the plurality, of contact holes are formed, and forming the plurality of first electrode serials and the plurality of second electrode serials by patterning the second conductive layer with a photolithography process and an etching process using a third mask.

9. A touch screen panel, comprising:
   a substrate including an electrode forming part, and a routing wire forming part, the routing wire forming part located at an area outside the electrode forming part;
   a plurality of first electrode connection patterns on the substrate and separate from each other;
   a plurality of first routing wires and a plurality of second routing wires, both in the routing wire forming part;
   a plurality of first serial electrodes arranged in parallel in a first direction, each first serial electrode comprising a plurality of first electrode elements separate from each other;
   the first electrode connection pattern connecting adjacent electrode elements of each first serial electrode, respectively;
   an insulation layer formed on a portion of the substrate and covering the first electrode connection patterns and the routing wire forming part, the insulation layer having first and second contact holes that expose contact portions of the plurality of first electrode connection patterns, third contact holes that expose connecting ends of the plurality of the first routing wires, and fourth contact holes that expose connecting ends of the second routing wires;
   a plurality of second serial electrodes arranged in parallel in a second direction, and configured to intersect the first serial electrodes, each second serial electrode comprising a plurality of second electrode elements; and the first serial electrodes connected with the plurality of first routing wires through the third contact holes, and the second serial electrodes connected with the plurality of second routing wires through the fourth contact holes, the insulation layer includes silicon nitride, and has a thickness of 5,000 Å to 10,000 Å.

10. The touch screen panel of claim 9, wherein the insulation layer comprises a first insulation patterns formed to expose a first portion and a second portion of the first connection pattern and a second insulation pattern formed to expose a portion of the first routing wire and a portion of the second routing wire.

11. The touch screen panel of claim 10, wherein the first electrode element is overlapped with at least one of the first portion of the first connection pattern, and a side wall and an upper surface of the first insulation pattern.

12. The touch screen panel of claim 9, wherein the first connection pattern and the first and second routing wires includes one of Al, AlNd, Cu, CuOx, Ag, Mo, MoTi and Cr.

13. The touch screen panel of claim 9, wherein the first connection pattern includes a transparent conductive material, and the first and second routing wires comprises a lower layer including one of Al, AlNd, Cu, CuOx, Ag, Mo, MoTi and Cr and an upper layer including a transparent conductive material.

14. The touch screen panel of claim 9, wherein the first connection pattern includes a lower layer including one of Al, AlNd, Cu, CuOx, Ag, Mo, MoTi and Cr and an upper layer including a transparent conductive material, and the first and second electrode elements comprises a lower layer including one of Al, AlNd, Cu, CuOx, Ag, Mo, MoTi and Cr and an upper layer including a transparent conductive material.

15. The touch screen panel of claim 9, wherein the first connection patterns has a thickness of about 2000 Å to about 3000 Å, and a width of about 3 μm to about 10 μm.

16. The touch screen panel of claim 9, wherein each of the pluralities of first and second electrode elements have a thicknesses of about 1200 Å to about 1600 Å.

17. A method of forming touch screen panel, comprising:
forming a first conductive pattern including a plurality of first electrode connection patterns and a plurality of first and second routing wires on a substrate, wherein the first electrode connection patterns are separate from each other, and the first electrode connection patterns are located on an electrode forming part, and first and second routing wires are located on an area outside of the electrode forming part;

forming an insulation layer on a portion of the substrate and covering the first electrode connection patterns and the first and second routing wires;

forming first and second contact holes in the insulation layer to exposed contact portions of the first electrode connection patterns, and forming third and fourth contact holes in the insulation layer to expose connecting ends of the first routing wires and connecting ends of the second routing wires;

forming a second conductive pattern including a plurality of first serial electrodes and second serial electrodes, the first serial electrodes formed in parallel in a first direction and the plurality of second serial electrodes formed in parallel in a second direction;

each first serial electrode comprising a plurality of first electrode elements separate from each other, wherein the first electrode connection pattern connects adjacent electrode elements of each first serial electrode through the first and second contact holes;

each second serial electrode comprising a plurality of second electrode elements and a second electrode connection pattern connecting adjacent electrode elements of each second serial electrode, respectively; and wherein the first serial electrodes intersect the second serial electrodes, the insulation layer includes silicon nitride, and has a thickness of 5,000 Å to 10,000 Å.

18. The method of claim 17, wherein the forming a first conductive pattern includes:
forming lower layers of the first and second routing wires in a routing wire forming part of the substrate; and
forming the first connection patterns in the electrode forming part of the substrate, and at the same time forming upper layers on the lower layers of the first and second routing wires, respectively, wherein the routing wire forming part is formed on the substrate at positions outside the electrode forming part.

19. The method of claim 17, wherein the forming a first conductive pattern includes:
sequentially forming a first conductive layer and a second conductive layer on the substrate; and
forming the plurality of first and second routing wires having multiple layers in the routing wire forming part and the plurality of first connection patterns in the electrode forming part by simultaneously patterning the first and second conductive layers.

* * * * *